US010133806B2

(12) United States Patent
Rahut et al.

(10) Patent No.: US 10,133,806 B2
(45) Date of Patent: Nov. 20, 2018

(54) SEARCH RESULT REPLICATION IN A SEARCH HEAD CLUSTER

(71) Applicant: Splunk Inc., San Francisco, CA (US)

(72) Inventors: Anirban Rahut, Santa Clara, CA (US); Sundar Vasan, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 687 days.

(21) Appl. No.: 14/449,069

(22) Filed: Jul. 31, 2014

(65) Prior Publication Data

US 2016/0034555 A1 Feb. 4, 2016

(51) Int. Cl.
*G06G 7/00* (2006.01)
*G06F 17/30* (2006.01)

(52) U.S. Cl.
CPC .. *G06F 17/30598* (2013.01); *G06F 17/30575* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 6,879,995 B1 * | 4/2005 | Chinta | H04L 67/24 709/204 |
| 7,222,119 B1 * | 5/2007 | Ghemawat | G06F 17/30171 |
| 8,412,696 B2 | 4/2013 | Zhang et al. | |
| 8,589,403 B2 | 11/2013 | Marquardt et al. | |
| 8,682,925 B1 | 3/2014 | Marquardt et al. | |
| 9,081,843 B2 * | 7/2015 | Leshchiner | G06F 17/30578 |
| 9,356,793 B1 * | 5/2016 | Drobychev | H04L 12/2668 |
| 9,495,381 B2 * | 11/2016 | Shvachko | G06F 17/30174 |
| 2008/0177767 A1 * | 7/2008 | Lin | H04L 45/64 |
| 2009/0204583 A1 * | 8/2009 | Hechler | G06F 17/3056 |
| 2012/0226661 A1 * | 9/2012 | Kenthapadi | G06F 17/30864 707/634 |
| 2013/0318236 A1 | 11/2013 | Coates et al. | |
| 2013/0318603 A1 | 11/2013 | Merza | |

(Continued)

OTHER PUBLICATIONS

Diego Ongaro; In Seach of an Understanable Consensus Algorithm; May 2014; pp. 1-18.*

(Continued)

*Primary Examiner* — Mariela Reyes
*Assistant Examiner* — Jermaine Mincey
(74) *Attorney, Agent, or Firm* — Lowenstein Sandler LLP

(57) ABSTRACT

Systems and methods for search result replication in a search head cluster of a data aggregation and analysis system. An example method may comprise maintaining a replication count corresponding to how many replicas of a result of a particular map-reduce search exist in a search head cluster comprising a plurality of search heads that are each configured to enable them to manage a reduce phase of a map-reduce search, determining that the replication count is less than a target replication count, selecting, based the determining, a target search head from the search head cluster to receive a replica of the search result, initiating a replication of the search result from a source search head in the search head cluster to the selected target search head, receiving an indication that the replication is complete, and based on receiving the indication, increasing the replication count corresponding to the search result.

31 Claims, 21 Drawing Sheets

(56) References Cited

U.S. PATENT DOCUMENTS

2013/0326620 A1 12/2013 Merza et al.
2014/0160238 A1 6/2014 Yim et al.

OTHER PUBLICATIONS

Eamonn J. Keogh et al.; Scaling up Dynamic Time Warping for Dataming Applications; ACM;2000; pp. 285-289.*
Bitincka, Ledion, et al., "Optimizing Data Analysis with a Semi-Structured Time Series Database", Splunk Inc., 2010 pp. 1-9.
Carasso, David, "Exploring Splunk Search Processing Language (SPL) Primer and Cookbook", Splunk Inc., 2012 CITO Research, New York, 154 Pages.
http://docs.splunk.com/Documentation/PCI/2.1.1/ [000119] User/IncidentReviewdashboard, 2 Pages (Last accessed Aug. 5, 2014).
"VSphere Monitoring and Performance", VMware, Inc., Update 1, vSphere 5.5, EN-001357-02, 2010-2014, pp. 1-174 http://pubs.vmware.com/ vsphere-55/topic/com.vmware.ICbase/PDF/vsphere-esxi-vcenter-server-551-monitoring-performance-guide.pdf.
U.S. Appl. No. 14/167,316, filed Jan. 29, 2014.
U.S. Appl. No. 14/266,812, filed Apr. 30, 2014.
U.S. Appl. No. 14/266,817, filed Apr. 30, 2014.
Diego Ongaro and John Ousterhout, In Search of an Understandable Consensus Algorithm (Extended Version), Stanford University, published May 20, 2014, 18 pages.
Jeffrey Dean and Sanjay Ghemawat, "MapReduce: Simplified Data Processing on Large Clusters", Google, Inc., OSDI 2004, 13 pages.

* cited by examiner

Original Search: 501
search "error | stats count BY host

Sent to peers: 502
search "error | prestats count BY host (map)

Executed by search head: 503
Merge prestats results received from peers (reduce)

SEARCH RESULT REPLICATION IN A SEARCH HEAD CLUSTER

TECHNICAL FIELD

The present disclosure is generally related to data aggregation and analysis systems, and is more specifically related to search result replication in a search head cluster.

BACKGROUND

Modern data centers often comprise thousands of hosts that operate collectively to service requests from even larger numbers of remote clients. During operation, components of these data centers can produce significant volumes of machine-generated data. The unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 13 illustrates an exemplary search query received from a client and executed by search peers in accordance with the disclosed embodiments.

FIG. 14B illustrates a data summary dialog that enables a user to select various data sources in accordance with the disclosed embodiments.

DETAILED DESCRIPTION

Figure 1:
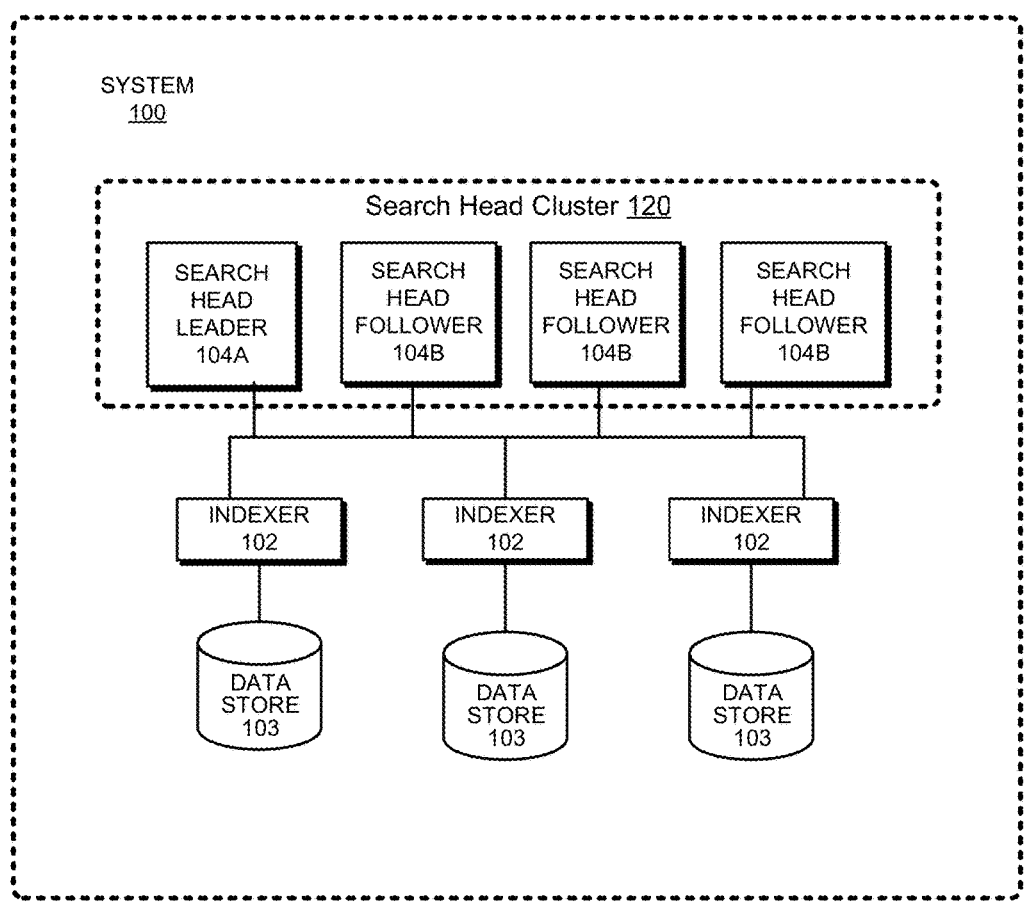
FIG. 1 presents a block diagram of an event-processing system for performing search result replication in a search head cluster, in accordance with the disclosed embodiments.

Disclosed herein are systems and methods for search result replication in a search head cluster. The search head cluster may include one or more search heads of a data aggregation and analysis system grouped together to form a cluster. A search head may refer to a component of the data aggregation and analysis system that is responsible for a reduce phase of a map-reduce search performed by the data aggregation and analysis system, as further described below. A search head may communicate with one or more indexers that are responsible for a map phase of the map-reduce search, as further described below.

An example data aggregation and analysis system may aggregate heterogeneous machine-generated data received from various sources, including servers, databases, applications, networks, etc. The aggregated source data may comprise a plurality of events. An event may be represented by a data structure that is associated with a certain point in time and comprises a portion of raw machine data (i.e., machine-generated data). The system may be configured to perform real-time indexing of the source data and to execute real-time, scheduled, or historic searches on the source data. A search query may comprise one or more search terms specifying the search criteria. Search terms may include keywords, phrases, Boolean expressions, regular expressions, field names, name-value pairs, etc. The search criteria may comprise a filter specifying relative or absolute time values, to limit the scope of the search by a specific time value or a specific time range. The search query may also process retrieved data, such as by determining aggregates or calculating statistics or deriving values for performance metrics.

The search result may be stored on a local disk of the search head that executed the search query. The search result may also be referred to as an artifact, a search directory (e.g., referring to the location where the search result is stored), a dispatch directory (e.g., referring to the location where the search result is stored), a resulting dataset, or a search identifier (ID) (e.g., referring to the identifier of the search result), to name a few examples.

The example data aggregation and analysis system may be employed to replicate search results across search heads of a search head cluster implemented by the data aggregation and analysis system associated with a distributed computer system (e.g., an enterprise system comprising a plurality of computer systems and peripheral devices interconnected by a plurality of networks). Accordingly, implementations of the disclosure provide an effective mechanism for providing high availability, data recovery, and network communication efficiency for a data aggregation and analysis system by replicating search results generated by the system.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

FIG. 1 presents a block diagram of an exemplary event-processing system 100 (e.g., a data aggregation and analysis system) (hereinafter referred to as "system 100") for replicating search results in a search head cluster, in accordance with one or more aspects of the present disclosure. In one implementation, system 100 is similar to the SPLUNK® ENTERPRISE system produced by Splunk Inc. of San Francisco, Calif., which is described in more details herein below). System 100 is also described in further detail below with respect to FIG. 9.

System 100 includes one or more indexers 102 that store, process, and/or perform operations on data obtained from a variety of different sources, wherein each indexer operates on data contained in a specific data store 103. These indexers 102 can comprise separate computer systems in a data center, or may alternatively comprise separate processes executing on various computer systems in a data center.

During operation, the indexers 102 receive the collected data, which is distributed across different indexers to facilitate parallel processing. This parallel processing can take place at data ingestion time, because multiple indexers 102 can process the incoming data in parallel. The parallel processing can also take place at search time, because multiple indexers 102 can search through their respective portions of the collected data in parallel.

Each indexer 102 is responsible for storing and searching a different subset datastore 103 of all of the events contained collectively within the system. As discussed in more detail below with respect to FIG. 9, an "event" may comprise a portion of performance data and/or diagnostic information that is generated by a computer system and is correlated with a specific point in time. By distributing events among the indexers 102 and data stores 103, the indexers 102 can analyze events for a query in parallel, for example using map-reduce techniques (described further below with respect to FIG. 9), wherein each indexer 102 returns partial responses for a subset of events to a search head 104 that combines the results to produce an answer for the query. By storing events in buckets for specific time ranges, an indexer 102 may further optimize searching by looking only in buckets for time ranges that are relevant to a query.

The indexers 102 may be communicably coupled to one or more search heads 104A-B of a search head cluster 120. A search head 104A-B may comprise a server device accessible by a number of client devices (not shown) over a network. Search head 104A-B is a component that is responsible for receiving and processing a search query. The search query may be sent from a client (e.g., a browser communicating with system 100). The search head 104A-B may analyze the received search query and determine which portions of the query may be delegated to indexers 102 and what portions should be executed locally by the search head 104A-B. The search head 104-A-B may be responsible for a reduce phase of a map-reduce search by combining partial results and/or events received from indexers 102 to produce a final search result for the query. This final search result can comprise different types of data depending on what the query is asking for. Further details on the responsibilities and operations of search head 104A-B are discussed below with respect to FIG. 11.

Although the search head 104A-B is described as having the duties of both performing searches to produce results and making previously produced search results available to clients, these duties could be separated, with the entities storing the results of the search and making them available to clients doing so according to the methods of the present disclosure.

In some implementations, the system 100 may horizontally scale the search capability (e.g., increase the number of searches than can be run) of system 100 by creating a pool of search heads 104A-B referred to as a search head cluster 120. Within the search head cluster 120, each search head 104A-B is communicably coupled to each indexer 102. The search heads 104A-B may be located at one or more sites, each site being remote from the other site, e.g., in different geographic locations. In one embodiment, all of the search heads 104A-B of the search head cluster 120 are located at a single site. In another embodiment, at least two of the search heads 104A-B are located at a single site and at least one other of the search heads 104A-B is located at a different site. In another embodiment, each search head 104A-B is located at a different site.

It may be advantageous for the search heads 104A-B to interact with each other as a single server cluster, referred to as the search head cluster 120. At a search head cluster 120, instructions to perform a task received by one of the search heads 104A-B may be performed by any of the search heads 104A-B according to the load on each of the search heads 104A-B.

The search head cluster 120 may be operated in a symmetric mode in which each search head 104A-B has an equal role or in an asymmetric mode in which one of the search heads 104A is designated the "leader" or "captain" (referred to herein as "search head leader") and has authority to issue commands to other search heads 104B (referred to herein as "search head followers") and make decisions regarding the system. For example, each search head 104A-B may forward instructions from client devices to perform tasks according to a schedule to the search head leader 104A. In turn, the search head leader 104A may schedule the tasks to be performed by the various search head followers 104B by issuing commands to the various search head followers 104B to perform the tasks at specified times. Because, as described below, any of the search heads 104A-B may be designated the leader, each of the search heads 104A-B includes a scheduling module (not shown) to perform this task in the event the search head 104A-B is elected the leader.

In the asymmetric mode, each search head 104A-B is either in a leader state, a follower state, or a candidate state. In the leader state, the search head 104A acts as the leader and makes decisions regarding the cluster 120 and issues commands to other search head followers 104B. In the follower state, the search head follower 104B receives commands from the search head leader 104A and follows the commands. A search head 104A-B may enter the candidate state during a leader election process as described further below. Each of the search heads 104A-B includes an election module (not shown) to perform a leader election process. The leader election process may be, for example, a consensus election process that uses the Raft consensus protocol as discussed in more detail below. The Raft consensus protocol is further described in "In Search of Understandable Consensus Algorithm (Extended Version)" by Diego Ongaro and John Ousterhout, Stanford University, 2014, which is hereby incorporated herein by reference in its entirety for all purposes.

Other consensus algorithms or leader selection protocols may also be utilized in implementations of the disclosure. The purpose of the Raft protocol or other consensus election protocols is to ensure that there is always a leader search head for a search head cluster. In the case that a search head leader fails or is disconnected from the other search heads, the Raft protocol or other consensus election protocols may be utilized to elect a new search head leader.

With respect to the leader election process, during operation of the distributed system, time may be partitioned into terms. During each term, the search heads 104A-B attempt to elect a leader and, if a leader is elected, operate in the asymmetric mode. A term may begin during system initiation or when a search head 104A acting as the leader fails or is otherwise non-responsive (such as a network communication failure). Each search head 104A-B may store a numeric value identifying the current term (e.g., 1, 2, . . . N, etc.). This current term value may be stored in non-volatile memory such that when a search head 104A-B fails and is restarted, the search head 104A-B may access the current term value. During each term, each search head 104A-B may cast a single vote to elect one of the search heads 104A-B as a leader. Thus, each search head 104A-B may store, along with the current term value, an identifier of a search head 104A-B for which the search head 104A-B has voted to be a leader during the current term. The identifier may be stored in association with the current term value in non-volatile memory.

Figure 2:
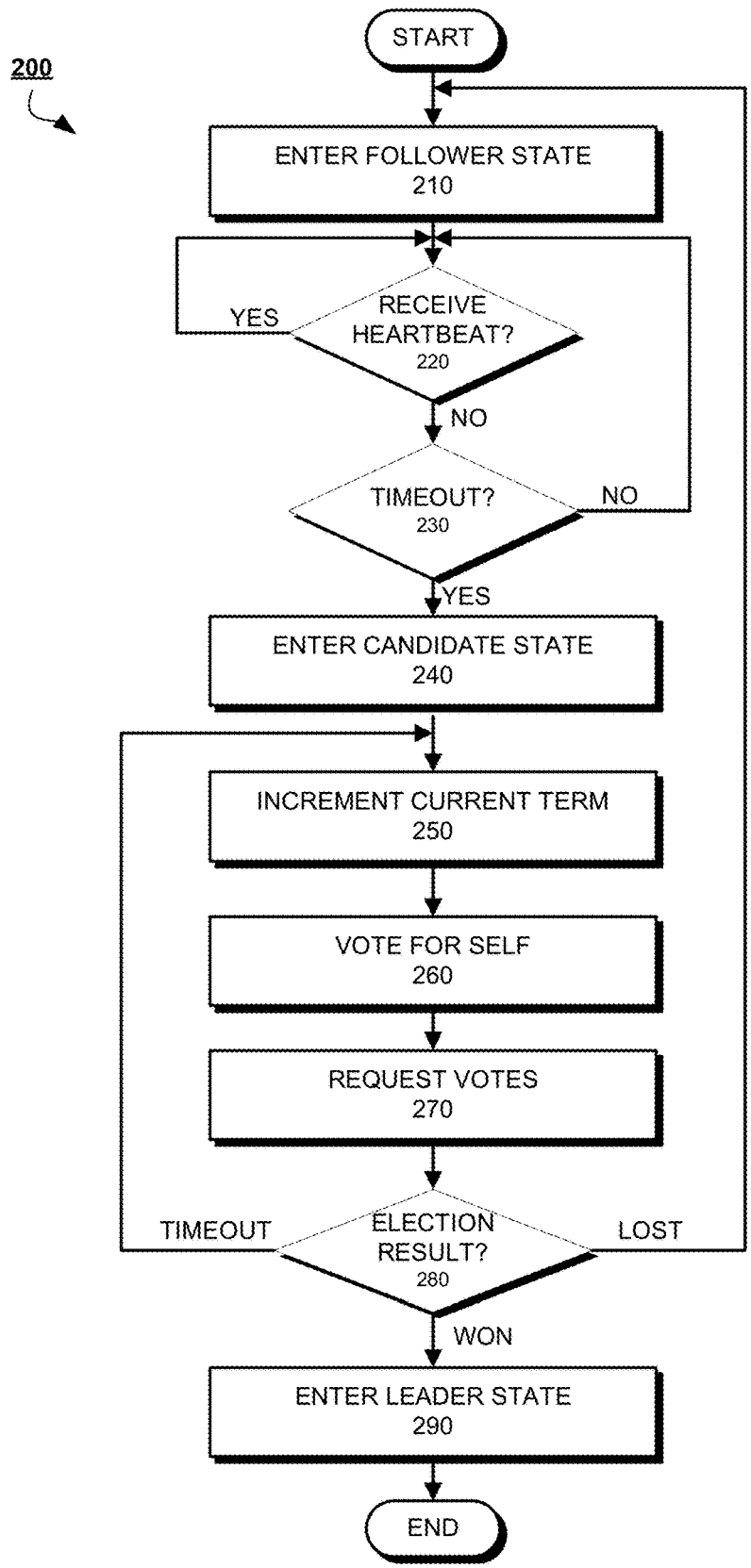
FIG. 2 depicts a flow diagram of an example method for search head leader election, in accordance with one or more aspects of the present disclosure.

FIG. 2 presents a flowchart illustrating a method 200 of how a search head, such as search head 104A-B described with respect to FIG. 1, operates in a distributed system to elect a leader. In one implementation, method 200 utilizes the Raft consensus protocol for the leader selection. When a search head is initialized, the search head starts in the follower state in block 210. The search head may be initialized when the distributed system is initialized. The search head may also be initialized because it has joined an existing distributed system or it failed and has been restarted. If a leader has been elected, the leader sends out periodic heartbeat messages to maintain its authority. The heartbeat messages may be transmitted approximately every 150 milliseconds. The heartbeat messages serve to inform the other search heads that the leader is operational. Accordingly, heartbeat messages may, in some circumstances, not be sent to a search head if the leader is sending other messages to the search head as these other messages serve to inform the search head that the leader is operational.

Thus, in the follower state, the search head expects to receive heartbeat messages from a leader on a periodic basis. If a period of time passes without the search head receiving a heartbeat message from a leader, referred to as a heartbeat timeout, the search head may begin an election process to elect a new leader. Thus, at block 220, the search head determines whether a heartbeat message has been received. If a heartbeat message has been received, the search head returns to block 220 to await another heartbeat message. If a heartbeat message has not been received, the search head continues to block 230 where it determines whether a heartbeat timeout has occurred. The heartbeat timeout may be randomly selected by the search head between a first value and a second value. For example, the heartbeat timeout may be selected by the search head as any value between 100 and 500 milliseconds. By randomly selecting a heartbeat timeout, each search head decides to begin the election process at a different time, preventing all of the search heads simultaneously transitioning to candidate state and requesting votes (as described below).

If the search head determines, at block 230, that a heartbeat timeout has not occurred, the search head returns to block 220 and awaits a heartbeat message. If the search head determines that a heartbeat timeout has occurred, the search head continues to block 240 where it enters the candidate state.

Once in the candidate state, the search head increments the current term value (e.g., by 1) stored in memory (at block 250), votes for itself (at block 260), and requests votes from the other search heads in the distributed system (at block 270). The search head may vote for itself by associating its own identifier with the updated current term value in non-volatile memory. The search head may request votes from the other search heads by transmitting messages to the other search heads including, among other things, the incremented current term value and the identifier of the requesting search head.

Each search head, upon receiving a request for a vote, may respond to the requesting search head. If the receiving search head has already not voted for another search head in the term indicated by the request, the receiving search head may vote for the requesting search head by storing the requesting search head's identifier in memory in association with the term value and sending a response to the requesting search head indicating that the receiving search head has cast its vote for the requesting search head. If the receiving search head has already voted for another search head, as indicated by another search head's identifier stored in the receiving search head's memory in association with the term value that matches the term value in the request, the search head may send a response to the requesting search head indicating that the request is denied.

At block 280, the search head determines the election results. If the search head receives a majority of votes, the election is won and the search head continues to block 290 where it enters into the leader state. The search head may determine that it has received a majority of the votes when the number of responses from other search heads (plus one for its own vote for itself) is greater than half the number of search heads in the distributed system. Once in the leader state, the search head sends out heartbeat messages to the other search heads, thereby indicating that it has taken on the leadership role. The other search heads may respond by sending heartbeat acknowledgement signals back to the leader. In one embodiment, if the leader does not receive heartbeat acknowledgment signals from at least a majority of the search heads in the distributed system, the search head abdicates its leadership role by transitioning to the follower state, returning to block 210.

If the search head receives a heartbeat message from another search head indicating that the other search head has transitioned to the leader state, the election is lost and the search head returns to block 210 where it enters into the follower state.

If a period of time elapses without the search head receiving a majority of votes or receiving a heartbeat message indicating that another search head has become the leader, referred to as an election timeout, the search head returns to block 250, where another term is begun and the election process begins again. An election timeout may occur when multiple search heads have transitioned to the candidate state and votes are split such that none of the search heads receive a majority of the votes. The election timeout may be the same as the heartbeat timeout or a different value. In one embodiment, the election timeout is randomly selected between 100 and 500 milliseconds.

Referring back to FIG. 1, when a search head cluster 120 is implemented by system 100, search results stored locally on one search head 104A-B may be not available to a client connected to another search head 104A-B of the search head cluster 120. Furthermore, if a search head fails, any search results stored locally at the search head 104A-B may be lost. In such a case, the search may have to be re-executed, resulting in runtime inefficiencies. Thus, in implementations of the disclosure, the search head leader 104A is responsible for search result replication among the search heads 104A-B of the search head cluster 120 in order to provide high availability of the search results stored at the search heads 104A-B of the search head cluster 120. In other implementations, the search head leader 104A is also responsible for proxying of search result requests to search heads to store a copy of the requested search results. The search result replication and proxying of implementations of the disclosure are described below in further detail with respect to FIGS. 3A-8.

Figure 3A:
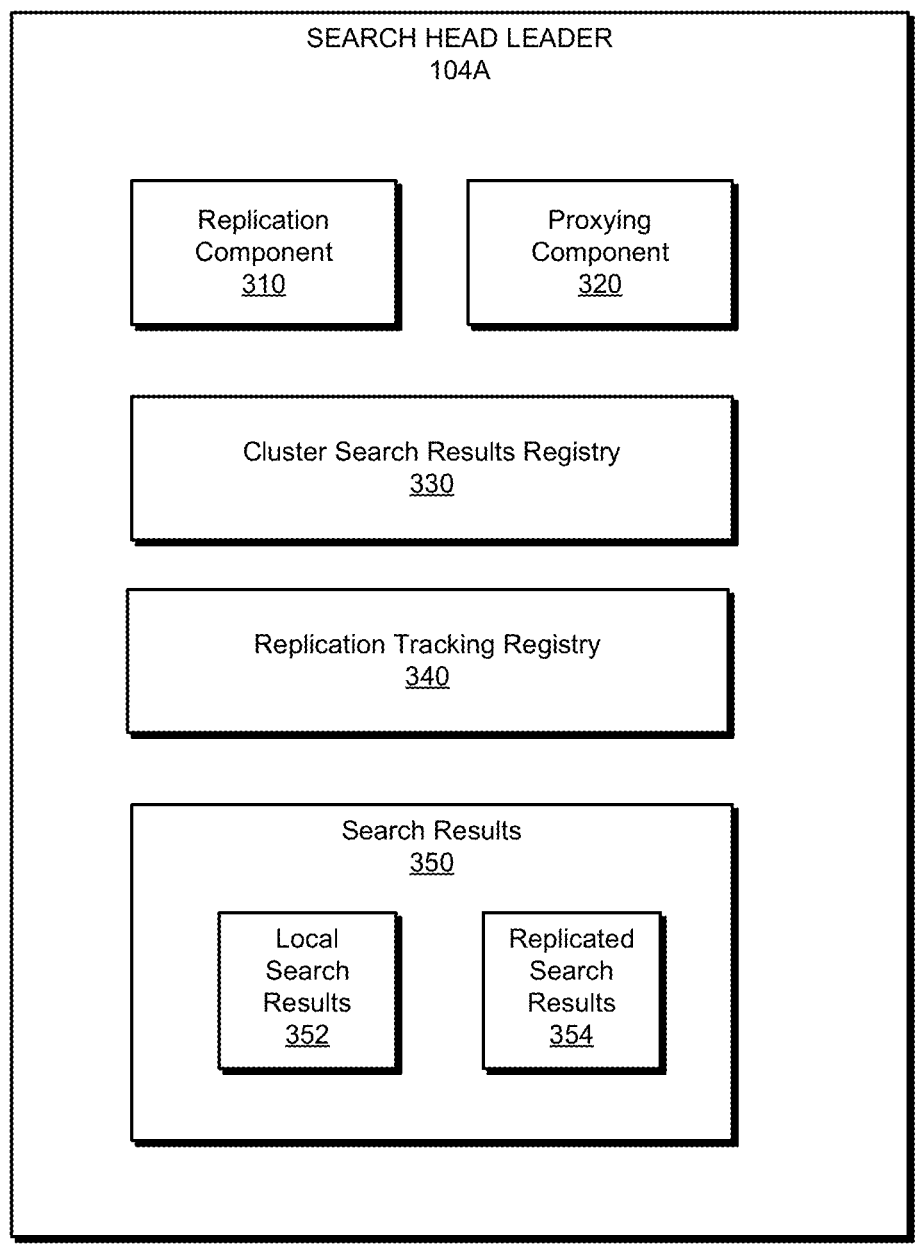
FIG. 3A presents a block diagram illustrating an exemplary search head leader to perform search result replication in a search head cluster, in accordance with one or more aspects of the present disclosure.

FIG. 3A presents a block diagram of an exemplary search head leader 104A, in accordance with one or more aspects of the present disclosure. Search head leader 104A may be the same as search head leader 104A described above with respect to FIG. 1, and selected per method 200 described above with respect to FIG. 2. As discussed above, if search head leader 104A fails, any of search head followers 104B may be elected as new search head leader 104A, and thus may also include the components detailed for search head leader 104A in FIG. 3A. In one implementation, search head leader 104A may comprise a computing device, such as a server device, and/or software or firmware executing on a computing device.

Referring to FIG. 3A, search head leader 104A may include a replication component 310. Replication component 310 is responsible for managing and performing search result replication among the search heads of the search head cluster. Replication component 310 may maintain and reference a cluster search results registry 330 and a replication tracking registry 340 as part of a replication process performed by replication component 310. The cluster search results registry 330 may be any type of data store, such as table or database, which maps all of the search results stored in the search heads of the search head cluster. The cluster search results registry 330 may include, but is not limited to, for each search result, a search result ID (SID), a source search node that produced the search result, one or more search nodes where the search result is replicated, a number of replications, and metadata associated with the search result (e.g., how long the search ran, what was the search string, when did the search start, when did the search end, interesting fields (e.g., fields specified in search terms of the search), execution statistics of search, etc.). When a search is initially completed by a search node, the search node provides the search result information detailed above to the search head leader 104A for inclusion in the cluster search results registry 330.

In one implementation, the cluster search results registry 330 is maintained in non-persistent memory of the search head leader 104A. If the search head leader 104A fails and a new search head is elected as leader, the new search head can request and/or receive search result information from the other search head members in the cluster in order to re-generate the cluster search results registry 330. In other implementations, the cluster search results registry 330 is maintained in persistent storage of the search head leader 104.

Figure 3B:
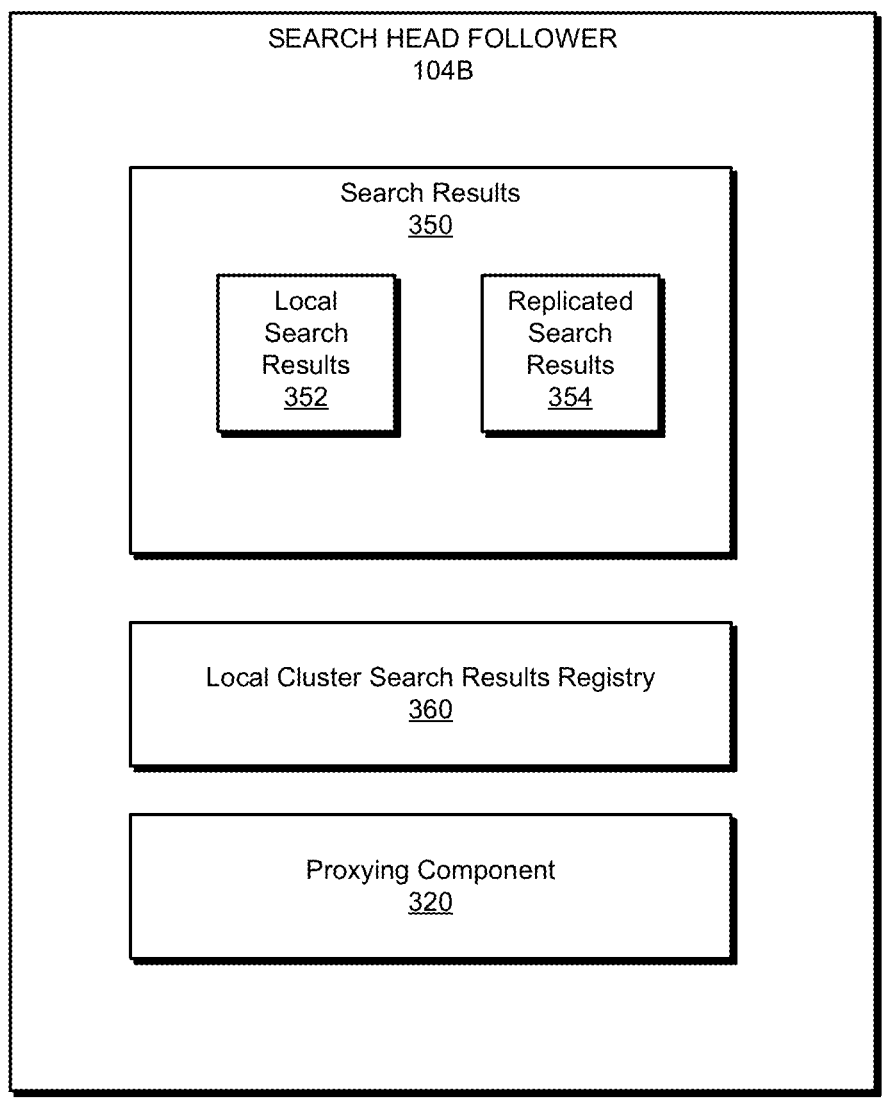
FIG. 3B presents a block diagram illustrating an exemplary search head follower to receive search result replication in a search head cluster, in accordance with one or more aspects of the present disclosure.

In some implementations, the search head leader 104A provides data of the cluster search results registry 330 to the other search heads (i.e., search head followers) in the search head cluster in order for the other search heads to maintain their own local copy of the cluster search results registry 330. FIG. 3B presents a block diagram of an exemplary search head follower 104B, in accordance with one or more aspects of the present disclosure. Search head follower 104B may be the same as search head followers 104B described above with respect to FIG. 1. In one implementation, search head follower 104B may comprise a computing device, such as a server device, and/or software or firmware executing on a computing device.

As shown in FIG. 3B, the search head follower 104B may include a local cluster search results registry 360 generated based on data provided from the search head leader 104A describing the state of the primary cluster search results registry 330 maintained by the search head leader 104A. In one implementation, the search head leader 104A periodically sends data representing a delta of the cluster search results registry 330 since a previous status update was sent by the search head leader 104A. Providing a delta reduces the amount of data to be sent over the network by the search head leader 104A to the search head followers 104A. In addition, in some implementations, a search head follower 104B may utilize its local cluster search results registry 360 to re-generate the primary cluster search results registry 330 if the search head follower 104B is elected as a new search head leader 104A. In addition, in some implementations, the search head follower 104B includes a proxying component 320, similar to the search head leader 104A. Details of the proxying component 320 are described further below with respect to FIG. 8.

Referring back to FIG. 3A, the replication tracking registry 340 may be any type of data store, such as table or database, which tracks in-progress replications occurring between search heads in the search head cluster. The replication tracking registry 340 may include, but is not limited to, an SID, a source search head originating the search result, a target search head receiving the search result replication, and a time when the replication started. The replication tracking registry 340 may be maintained in non-persistent memory of the search head leader 104A. In other implementations, the cluster search results registry 330 is maintained in persistent storage of the search head leader 104.

Each search head in a cluster, including the search head leader 104A and all search head followers 104B, may maintain a data store of search results 350. The search results 350 may include both local search results 352 performed by the respective search head and replicated search results 354 performed by other search heads in the cluster and replicated to the respective search head. Although illustrated as separate components, the local search results 352 and the replicated search results 354 may be stored together in a single data store.

Each search head 104A-B may also store a numeric value identifying a default (or target) replication count that configures the number of replicas of the search results to be maintained in a cluster. In one implementation, the default replication count is configured by an administrator of the data aggregation and analysis system and stored in a configuration file propagated to and maintained by each search head in a cluster. This default replication count may be stored in non-volatile memory such that when a search head 104A-B fails and is restarted, the search head 104A-B may access the default replication count.

The replication component 310 of search head leader 104A may manage a replication process for the search head cluster. FIGS. 4-7 provide further detail of the replication process performed by replication component 310. FIGS. 4-8 depict flow diagrams of example methods 400-800 for search result replication and proxying in a search head cluster. Methods 400-800 and/or each of their respective individual functions, routines, subroutines, or operations may be performed by one or more general purpose and/or specialized processing devices. Two or more functions, routines, subroutines, or operations of methods 400-800 may be performed in parallel or in an order that may differ from the order described above. In certain implementations, one or more of methods 400-800 may be performed by a single processing thread. Alternatively, methods 400-800 may be performed by two or more processing threads, each thread executing one or more individual functions, routines, subroutines, or operations of the respective method. In an illustrative example, the processing threads implementing methods 400-800 may be synchronized (e.g., using semaphores, critical sections, and/or other thread synchronization mechanisms). Alternatively, the processing threads implementing methods 400-800 may be executed asynchronously with respect to each other. In an illustrative example, methods 400-800 may be performed by an example computing device 1000 described herein below with reference to FIG. 16. In another illustrative example, methods 400-800 may be performed by a distributed computer system comprising two or more example computing devices 1000.

Figure 4:
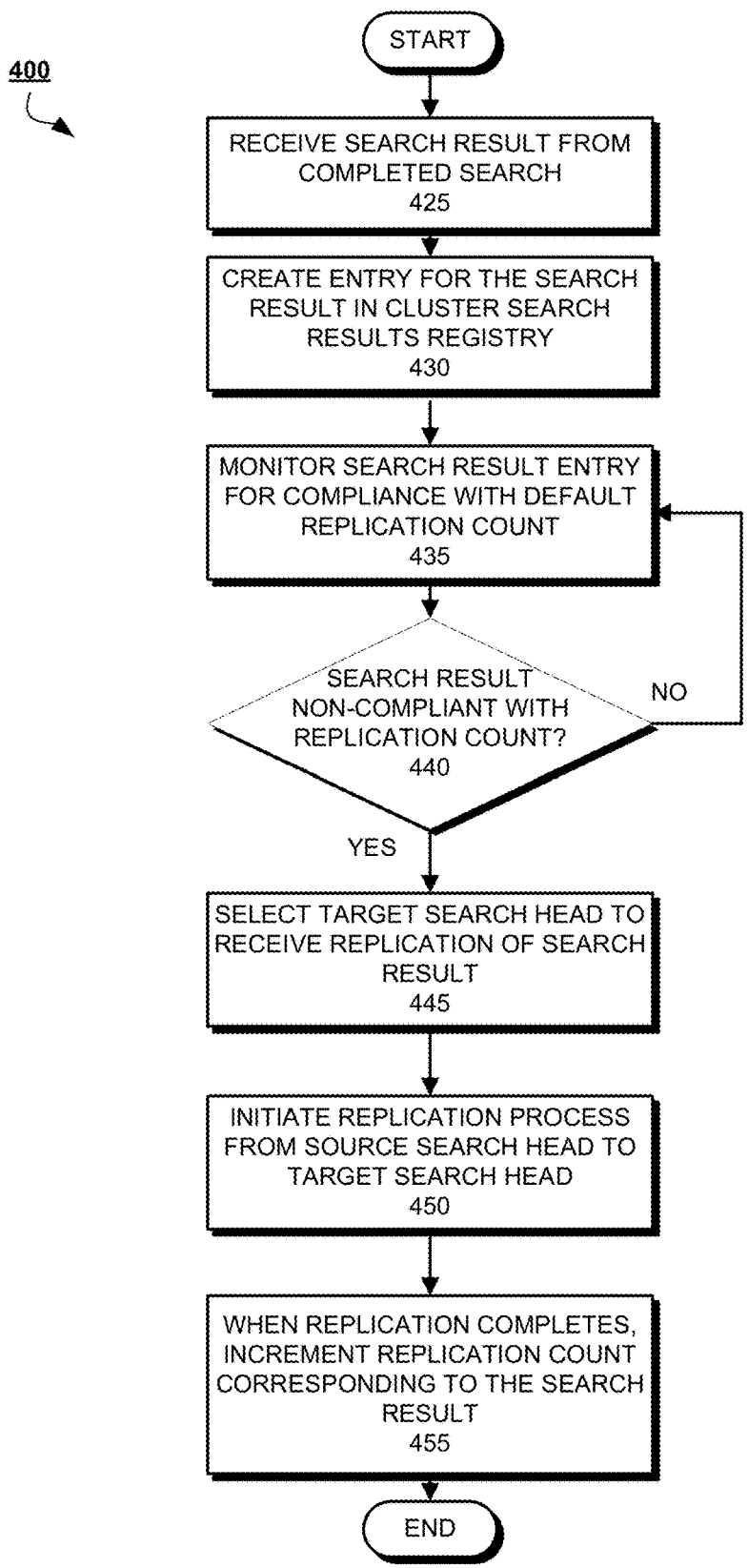
FIG. 4 depicts a flow diagram of an example method for search result replication in a search head cluster, in accordance with one or more aspects of the present disclosure.

FIG. 4 depicts a flow diagram of an example method 400 for search result replication in a search head cluster, in accordance with one or more aspects of the present disclosure. Referring to FIG. 4, at block 425, the computer system implementing the method may receive a search result from a completed search from one of the search heads in a search head cluster. The search result may be the product of the execution of a search query by one or more indexers and aggregated by the sending search head. In an illustrative example, the search query may represent a real-time search (e.g., may repeatedly be executed by a certain process or thread in an indefinite loop which may be interrupted by occurrences of certain terminating conditions). In another illustrative example, the search query may represent a scheduled search (e.g., may be executed according to a certain schedule). The search result may correspond to a search scheduled by the search head leader and forwarded to a search head follower for execution, or a search managed by the search head leader. The search result provided to the search head leader may include an SID of the search result and metadata associated with the search result, such as how long the search ran, the search string, when the search started, when the search ended, interesting fields of the search, execution statistics of the search, and so on.

Responsive to receiving the search result, at block 430, the search head leader creates a new entry for the search result in a cluster search results registry maintained by the search head leader. The cluster search results registry may be the same as the cluster search results registry 330 described above with respect to FIG. 3A. At block 435, the new search result entry is monitored for compliance with a configured replication count of the search head cluster. The replication count dictates how many locations in a search head cluster a search result should be replicated.

In some implementations, search results that are in an intermediate or in-transit state are not replicated until a final set of results is received at the search head leader. In addition, the search results that are "ad-hoc" in nature may not be replicated by the search head leader. An "ad-hoc" search result may refer to a search result that is performed one time and stored by the search head for a limited period of time. Furthermore, the search head leader may replicate the search results regardless of any sharing permissions associated with the search results. For example, if a search result is configured as a private search result that is not shared with any users other than the originating user, then this search result may still be replicated in order to provide high availability of the search result within the search head cluster. In other implementations, all search results, regardless of intermediate, in-transit, ad-hoc, scheduled, and/or permissions state are replicated. In further implementations, formatting metadata defining how the search result should be presented (or defining a visualization for the search result) as specified by an originating search query user may be replicated with the search result.

If, at decision block 440, the search result is in compliance (e.g., number of occurrences of search result in the cluster meets or exceeds the default replication count), then method 400 returns to block 435 to continue monitoring the search result entry. On the other hand, if it is determined, at decision block 440, that the search result is not in compliance (e.g., number of occurrences of search result in the cluster is less than the default replication count), then method 400 proceeds to block 445.

At block 445, a target search head is selected from the search head cluster to receive a replication of the search result. In one implementation, the search head leader performs a candidate selection process in order to determine the target search head to receive the replication. The candidate selection process may comprise applying a heuristic including, but not limited to, a random selection of a target search head, a site-aware selection of a target search head, and/or a balanced selection of a target search head. The site-aware selection may refer to selecting a target search head that is located at a different site (e.g., geographically) than the source search head that originated the search result and/or the other search heads that store copies (i.e., replicas) of the search result. In some implementations, the configuration settings associated with the particular search results may dictate that such a site-awareness policy be applied to the search result, and may indicate specific geographic sites of preference for such replications. In another implementation, the search head leader may apply learning algorithms to determine on which site a search result is most popular (e.g., keep count of how many accesses have occurred for the search result on a particular site), and based on that learning, may perform bias replications of the search result to the determine popular site(s).

The balanced selection may refer to distributing replications across the search head cluster in a balanced manner. For example, a replication may be biased to a search head that has the smallest number of search results stored at the search head, or has the smallest amount of search result memory consumed.

Figure 5:
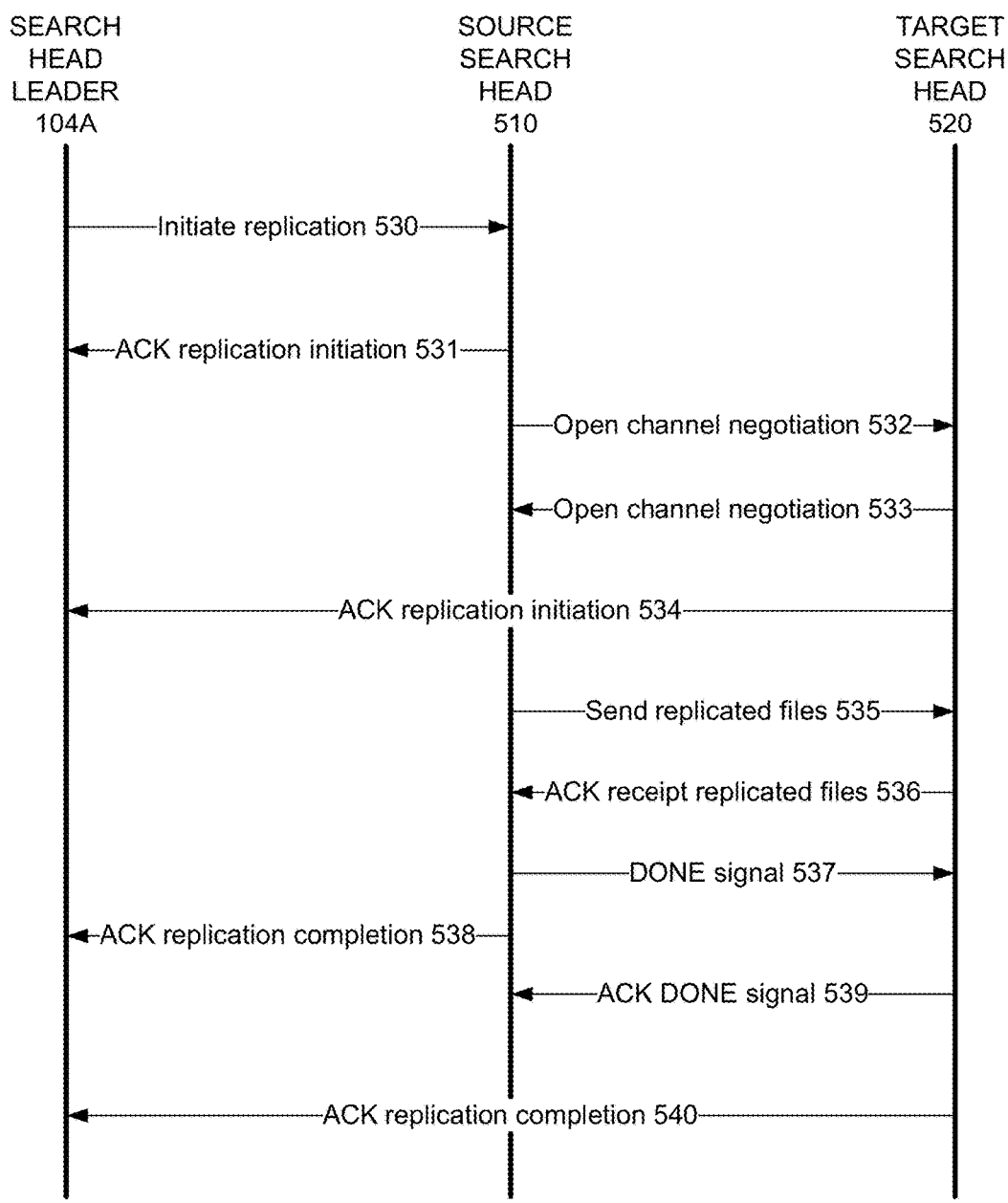
FIG. 5 schematically illustrates an example acknowledgement communication flow for performing search result replication in a search head cluster, in accordance with one or more aspects of the present disclosure.

Responsive to the selection of a target search head, at block 450, a replication process is initiated from the source search head originating the search result to the target search head. FIG. 5 schematically illustrates an exemplary replication process communication flow between the search head leader 104A, the source search head 510, and the target search head 520. The search head leader 104A initiates a replication process by sending a request 530 to the source search head 510 to start replicating the search result to the target search head 530. The source search head acknowledges 531 to the search head leader 104A that the source search head 510 is starting the replication process and asks the search head leader 104A to begin monitoring the replication process. In one implementation, the search head leader 104A may create a new entry in the replication tracking registry 340 of FIG. 3A to utilize in monitoring the in-progress replication process.

The source search head 510 also opens a channel with the target search head 510 via open channel negotiations 532, 533. The target search head 520, upon receiving the request to open the channel for the replication process from the source search head 510, acknowledges 534 to the search head leader 104A that the target search head is beginning to participate in the replication process. The source search head 510 then begins sending files of the search result 535 to replicate in a compressed format to the target search head 520 over the established channel. In one implementation, the underlying mechanism for sending and compressing the search result may utilize any known protocol that sends data in an efficient format. After every block of data is sent 535, the target search head 520 acknowledges 536 receipt of the data back to the source search head 510.

At the end of sending files for the search result, the source search head 510 sends a signal indicating that the data transfer is done 537 to the target search head 520. The source search head also acknowledges 538 back to the search head leader that the source search head 510 is done with the replication process. When the target search head 520 receives the done signal and all of the replicated data is pushed to search result storage (e.g., search results 350 of FIGS. 3A-3B) of the target search head 520, the target search head 520 acknowledges the done signal to the source search head 510 and acknowledges 540 to the search head leader 104A that the target search head 520 has completed its portion of the replication process.

Utilizing the acknowledgements received from the source search head 510 and the target search head 520, as tracked in the replication tracking registry 340, the search head leader 104A can coordinate and monitor the replication process for a search result. The search head leader 104A can determine, based on this information, whether a replication has completed or failed. For example, the search head leader 104A may utilize the tracked acknowledgements from the source search head 510 and the target search head 520, as well as failure notifications from the source search head 510 and the target search head 520, to determine when a replication has failed between two search heads. The search head leader 104A can then remove (flush) the tracked replication from the replication tracking registry 340, select another target search head to receive the search result replication, and re-start the replication process for the search result.

Referring back to FIG. 4, after the replication process is determined to be complete, at block 455, a replication count corresponding to the search result is incremented. In one implementation, the replication count corresponding to the search result is maintained in the cluster search result registry at the search head leader.

Figure 6:
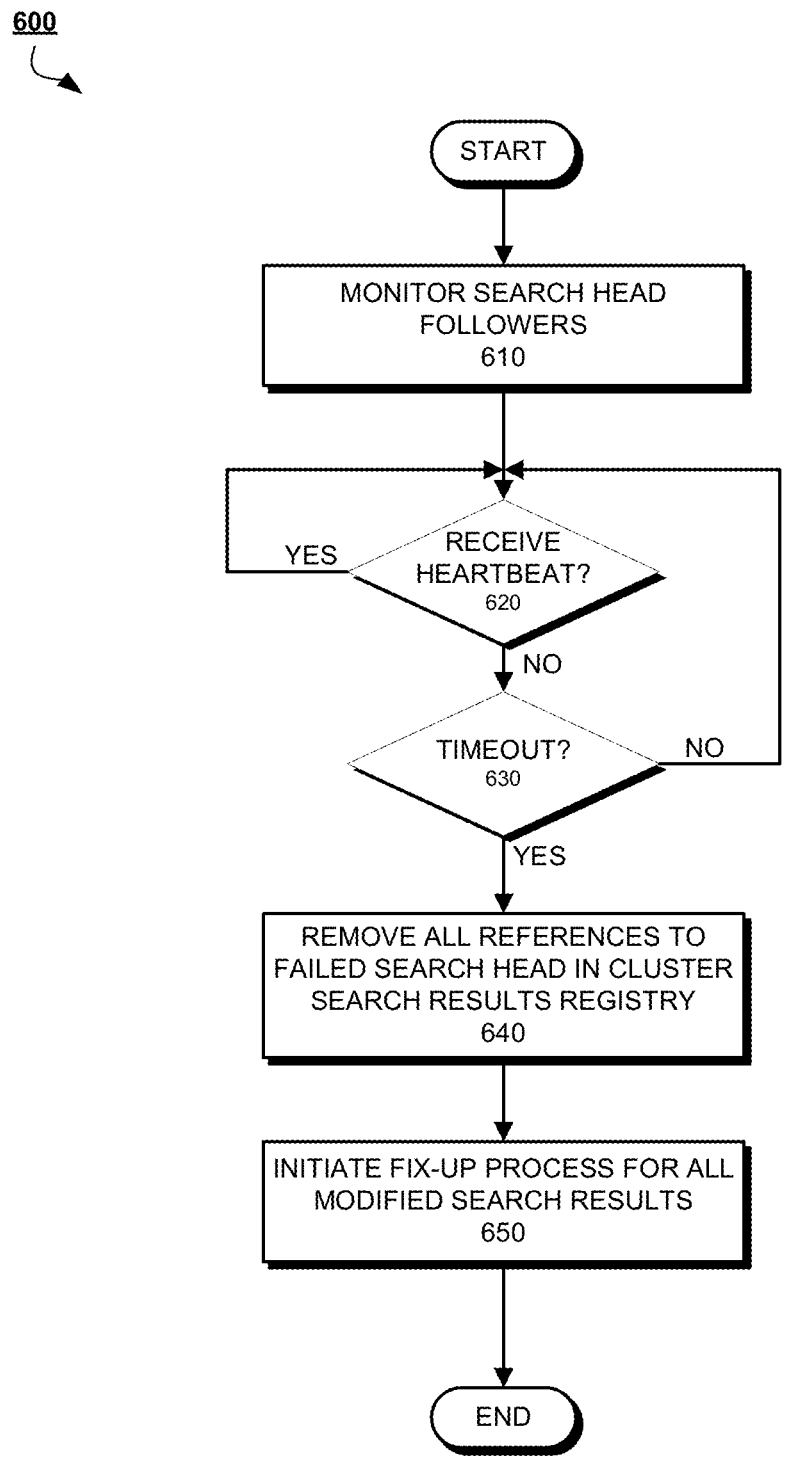
FIG. 6 depicts a flow diagram of an example method for a search head failure process in association with search replication in a search head cluster, in accordance with one or more aspects of the present disclosure.

FIG. 6 depicts a flow diagram of an example method 600 for a search head failure process in associated with search replication in a search head cluster, in accordance with one or more aspects of the present disclosure. Referring to FIG. 6, at block 610, the search head leader monitors search head followers in the search head cluster. In one implementation, the search head leader sends out periodic heartbeat messages to maintain its authority. For example, the heartbeat messages may be transmitted approximately every 150 milliseconds. The heartbeat messages serve to inform the other search heads that the search head leader is operational. Accordingly, heartbeat messages may, in some circumstances, not be sent to a search head follower if the search head leader is sending other messages to the search head follower as these other messages serve to inform the search head leader that the search head follower is operational. The search head followers acknowledge the received heartbeat messages from the search head leader, with their own heartbeat messages sent back to the search head leader.

If a period of time passes without the search head leader receiving a heartbeat message from a search head follower, referred to as a heartbeat timeout, the search head leader may begin a node failure process. Thus, at decision block 620, the search head leader determines whether a heartbeat message has been received for a search head follower. If a heartbeat message has been received, the search head leader returns to decision block 620 to await another heartbeat message. If a heartbeat message has not been received, the search head leader continues to decision block 630 where it determines whether a heartbeat timeout has occurred. The heartbeat timeout may be randomly selected by the search head leader between a first value and a second value. For example, the heartbeat timeout may be a configured time period established by an administrator of the data aggregation and analysis system, such as 60 seconds.

If the search head leader determines, at decision block 630, that a heartbeat timeout has not occurred, the search head leader returns to decision block 620 and awaits a heartbeat message. If the search head leader determines that a heartbeat timeout has occurred, the search head leader continues to block 640, where it begins a search head failure process for purposes of updating search replication of search results. At block 640, all references (e.g., listing or identifier of the failed search head) to the failed search head are removed from a cluster search results registry maintained by the search head leader. In one implementation, the cluster search results registry is the same as cluster search results registry 330 described with respect to FIG. 3A.

Subsequently, at block 650, a fix-up process is initiated for all modified search results from block 640. The fix-up process refers to the process for placing a search result in compliance with the replication policy (e.g., replication count) configured for the search head cluster. For example, a fix-up process may determine that a replication count associated with a search head is not in compliance with the default replication count, and thus may schedule the search result for replication at one or more search head (if more replicas should be provided per portions of method 400 described above with respect to FIG. 4) or may schedule the search result for removal of excess copies (e.g., per method 800 described below with respect to FIG. 8).

Figure 7:
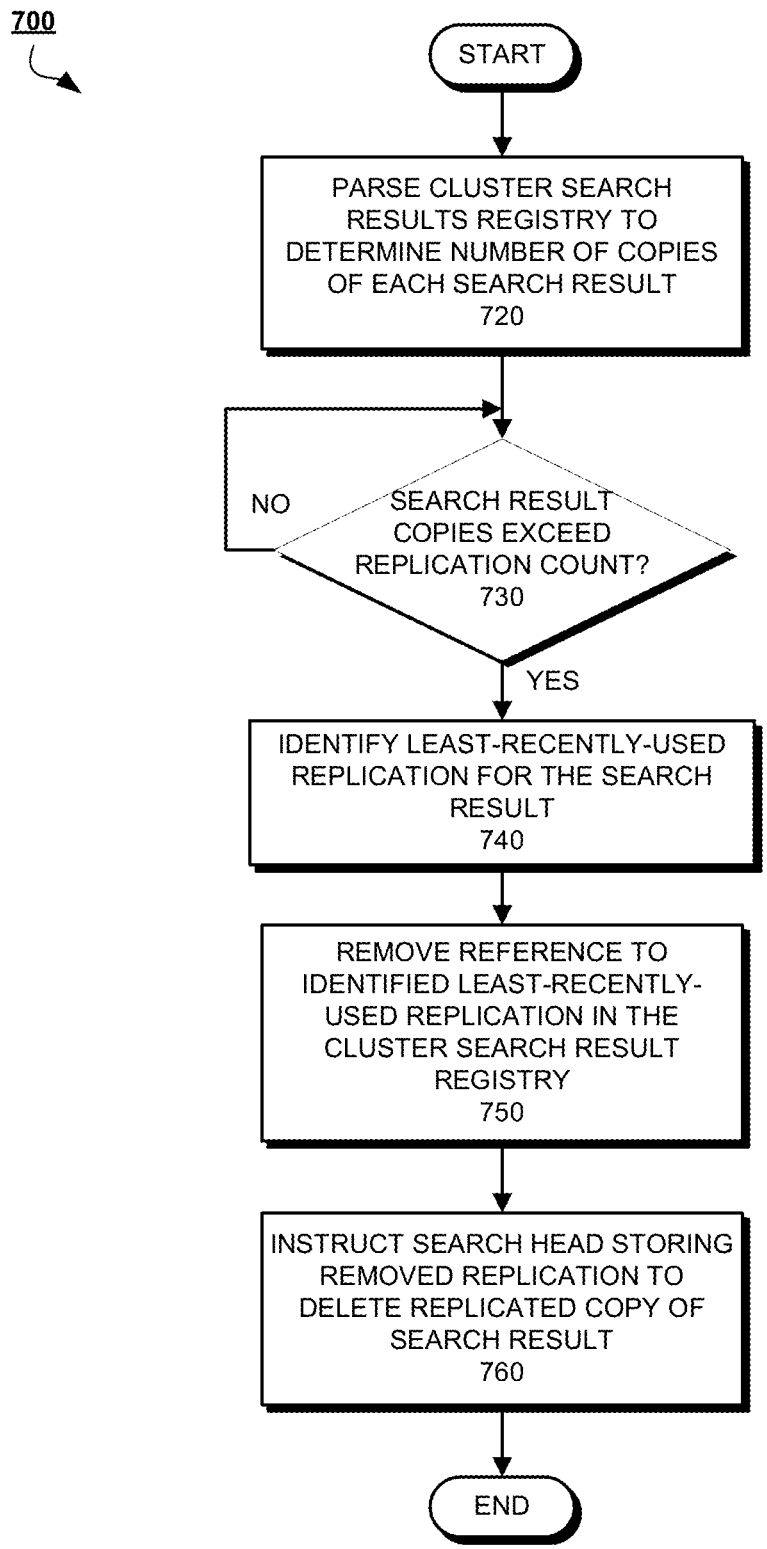
FIG. 7 depicts a flow diagram of an example method for removing excess copies of search results in association with search replication in a search head cluster, in accordance with one or more aspects of the present disclosure.

FIG. 7 depicts a flow diagram of an example method 700 for removing excess copies of search results in association with search replication in a search head cluster, in accordance with one or more aspects of the present disclosure. A number of search result replications in the search head cluster may exceed the default replication count, for example, when a search result is replicated due to a proxy request, as described further below with respect to FIG. 8. Referring to FIG. 7, at block 720, the search head leader parses a cluster search results registry to determine a number of copies of each search result. The number of copies may reflect both the original search result and the replicated search result(s), which are all identified in the cluster search results registry. Then, at decision block 730, it is determined whether the number of copies of a search result exceeds a default replication count configured for the search head cluster. If not, then method 700 returns to decision block 730 to examine remaining search results.

If the number of search results copies does exceed the default replication count at decision block 730, then method 700 proceeds to block 740, where a least-recently-used replication for the search result is identified. The search head leader may be informed of recency of use statistics by the search heads each time a copy is accessed at the search head. In some implementations, the search head leader may maintain a counter for each search result copy that is incremented each time the search head leader receives an indication that the particular search head copy was accessed. The search head leader may then select the search result replication with the lowest counter value for removal. In some implementations, the original search result is not considered for excess replication removal. In other implementations, the original search result may be considered for excess replication removal.

At block 750, the reference to the identified least-recently-used search result copy is removed from the cluster search results registry. Then, at block 760, the search head storing the removed replication is instructed to delete the replicated search result copy from its search results storage.

Referring back to FIG. 3A, the search head leader 104A may also include a proxying component 320. Proxying component 320 is responsible for enabling proxying of search result requests within the search head cluster 104 by managing updates of search result states to the other search heads in the search head cluster and, optionally, performing search result replication based on results of proxy requests. Although replicating search results provides for high-availability of the search results within the cluster, the replication may not involve replicating search results to all search heads in the cluster, as this can be inefficient in terms of storage and network communications. However, when search results are replicated to a subset (e.g., a smaller set) of the search heads in the cluster, it may result in a user device communicating, during a user session, with a search head (referred to herein as the "local search head") that does not maintain a local copy of the search result (either the originally-generated search result or a replicated version of the search result). Proxying of search requests in implementations of the disclosure enables the local search head to intelligently direct the user device to another search head that stores the specific search result replication. Further details of the replication process performed by a search head (e.g., local search head) are described with respect to FIG. 8.

Figure 8:
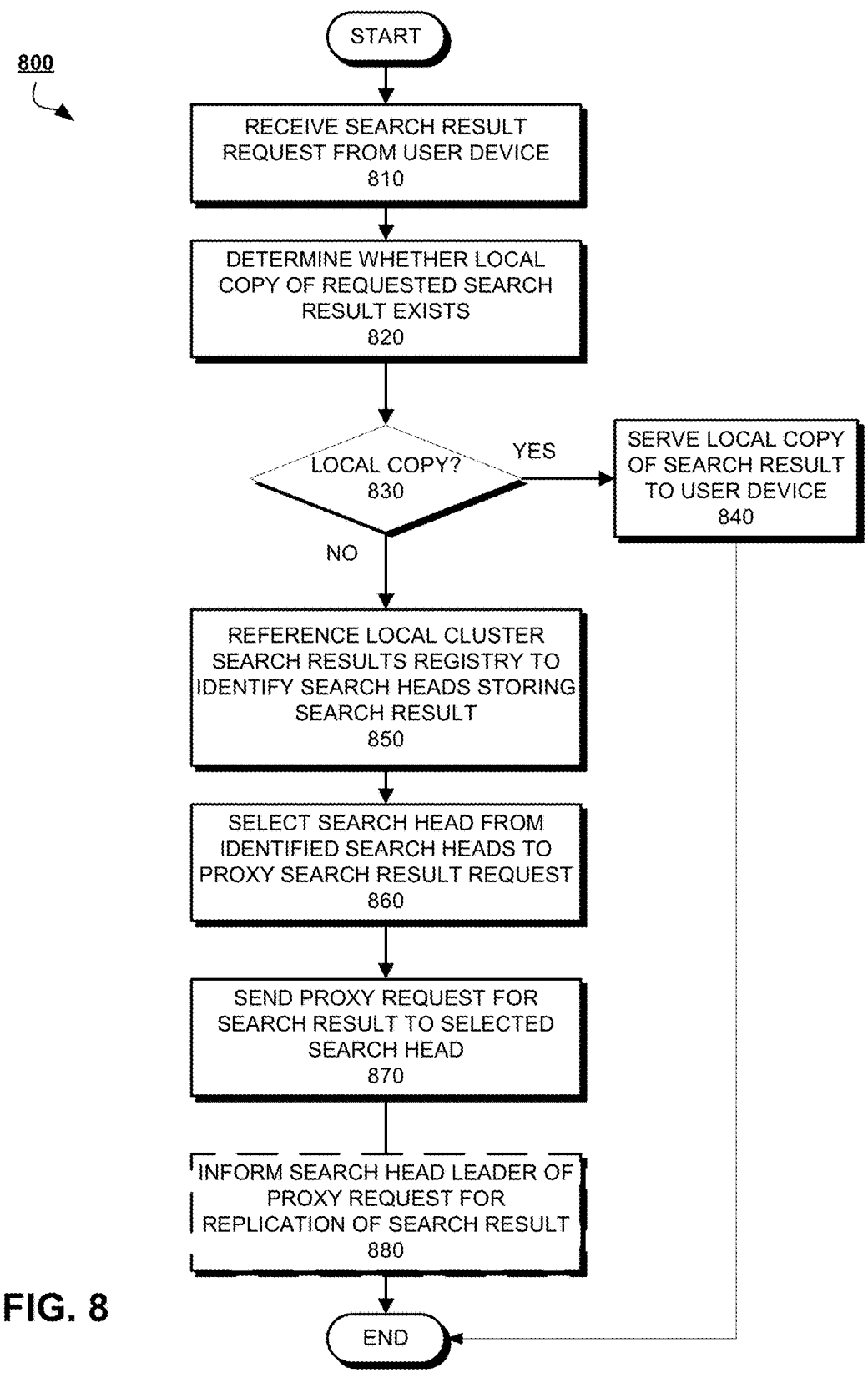
FIG. 8 depicts a flow diagram of an example method for search result proxying utilizing replicated search results in a search head cluster, in accordance with one or more aspects of the present disclosure.

FIG. 8 depicts a flow diagram of an example method 800 for search result proxying utilizing replicated search results in a search head cluster, in accordance with one or more aspects of the present disclosure. In some implementations, a proxying component 320 of a search head may perform the proxying process described herein. Referring to FIG. 8, at block 810, a search result request is received from a user device at a local search head during a user session. In one implementation, the user device may include a browser, which communicates the search result request to the search head. At block 820, the local search head determines whether a local copy of the request search results is stored at the local search head. The search result may be stored at the local search head if the local search head originated the search result or received a replica of the search result as part of the search result replication describe above. In one implementation, the local search head may reference its local cluster search result registry or may look directly at a file system of the local search head in order to determine if the local search head has a local copy of the search result.

If a local copy of the search result is found at decision block 830, then method 800 proceeds to block 840 to serve the local copy of the search result to the user device. If a local copy of the search result is not found at decision block 830, the method 800 continues to block 850. At block 850, the local cluster search result registry is referenced to identify one or more search heads of the search result cluster that have a copy of the search result. As discussed above, the local cluster search results registry may be a local copy that tracks a state of the primary cluster search results registry maintained by the search head leader. In one implementation, a proxying component 320, as described with respect to FIG. 3A, of the search head leader may periodically send to each search head follower a state of the cluster search results registry maintained at the search head leader. The proxying component 320 may send a delta (e.g., rolling update) of the cluster search results registry to the search head follower so that the entire cluster search results registry is not sent each time; instead, updates (e.g., which search results have been replicated to which search heads, which search results have been deleted, etc.) from the previous transmission are provided.

Responsive to identifying search heads having the search result from the local cluster search results registry, a candidate selection process is applied to the identified search heads at block 860. The candidate selection process selects one of the identified search heads to proxy the search result request. In one implementation, the candidate selection is site-aware so that the search head that is closest to the local search head in terms of site (e.g., geographic placement) is biased for selection purposes. If there is more than one search head equally close (e.g., at the same site) to the local search head, then the local search head may randomly select between the equally close search heads. If there are no search head candidates close to the local search head in terms of site, then the local search head may randomly select from the candidate search heads.

At block 870, a proxy request for the search result is sent to the selected search head. Proxying may include, but is not limited to, a HyperText Transport Protocol (HTTP) proxy request, any type of redirect request that is natively supported by HTTP, a REST API call, and so on. Once the selected search head receives the proxy request, the search result is obtained from the selected search head and served back to the user device.

In one implementation, if the local search head has no knowledge of the search result in its local cluster search results registry (e.g., the local cluster search results registry may not be up-to-date) and/or the selected search head is not responsive, the local search head may request search result location information from the search head leader. In one implementation, the proxying component 320 of the search head leader may respond to the proxy information request. In other implementations, when a proxy request to a selected search head fails, the local search head may select and try another search result location determined from the local cluster search results registry of the local search head.

In some implementations, the local search head may optionally, at block 880, inform the search head leader that a proxy request was made to the selected search head. In addition, the local search head may inform the search head leader that the search results should be replicated to the local search head because of the proxy request. In one implementation, the search head leader may asynchronously replicate the search result to the local search head in response to the proxy request notification. If the search result is replicated, the search head leader may then perform method 700 of FIG. 7, for example, to remove the excess copies of the search result from the search head cluster. Once the search result is replicated, the local search head then finds the search result locally and does not have to proxy to obtain the search result.

The systems and methods described herein above may be employed by various data processing systems, e.g., data aggregation and analysis systems. In certain implementations, the example data aggregation and analysis system may perform search queries on performance data that is stored as "events," wherein each event comprises a collection of performance data and/or diagnostic information that is generated by a computer system and is correlated with a specific point in time. In various illustrative examples, the data processing system may be represented by the SPLUNK® ENTERPRISE system produced by Splunk Inc. of San Francisco, Calif., to store and process performance data.

1.1 Overview

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

Figure 9:
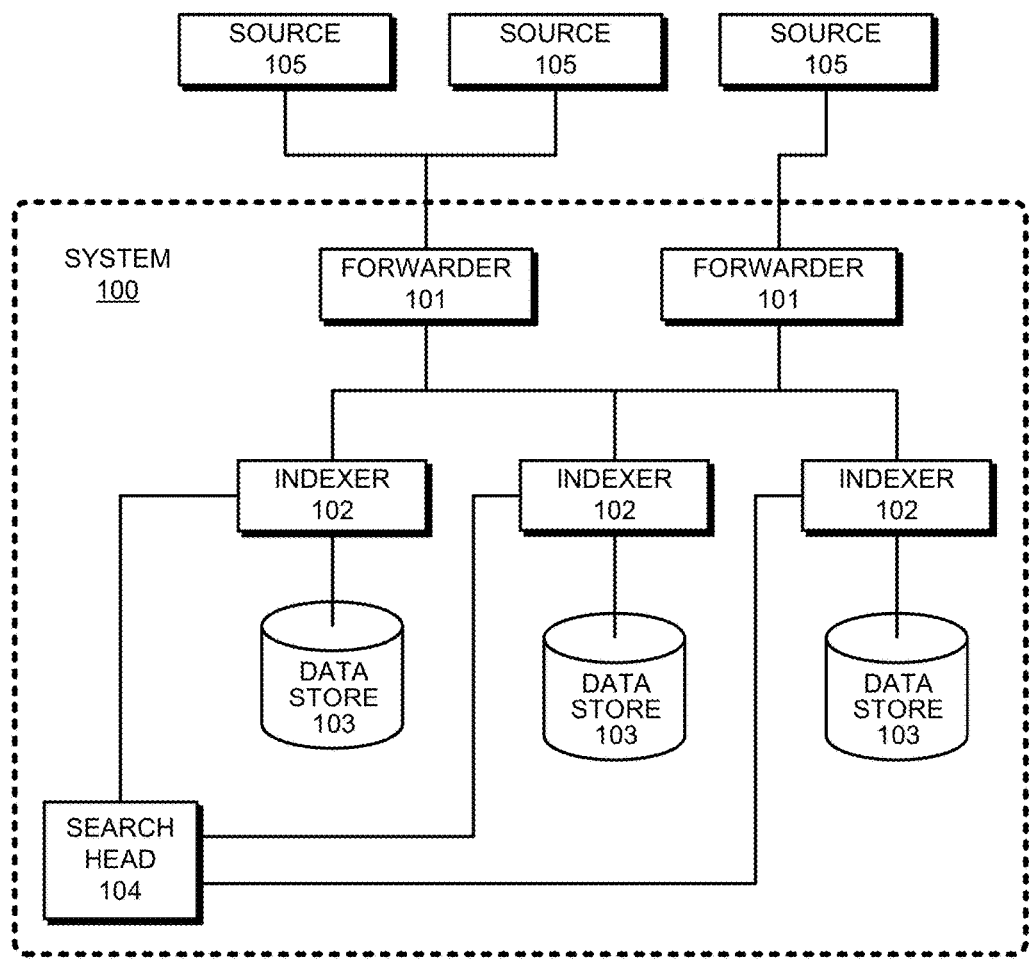
FIG. 9 presents a block diagram of an event-processing system in accordance with the disclosed embodiments.

FIG. 9 presents a block diagram of an exemplary event-processing system 100, similar to the SPLUNK® ENTERPRISE system. System 100 includes one or more forwarders 101 that collect data obtained from a variety of different data sources 105, and one or more indexers 102 that store, process, and/or perform operations on this data, wherein each indexer operates on data contained in a specific data store 103. These forwarders and indexers can comprise separate computer systems in a data center, or may alternatively comprise separate processes executing on various computer systems in a data center.

During operation, the forwarders 101 identify which indexers 102 will receive the collected data and then forward the data to the identified indexers. Forwarders 101 can also perform operations to strip out extraneous data and detect timestamps in the data. The forwarders next determine which indexers 102 will receive each data item and then forward the data items to the determined indexers 102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below with respect to FIGS. 1-5 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 10:
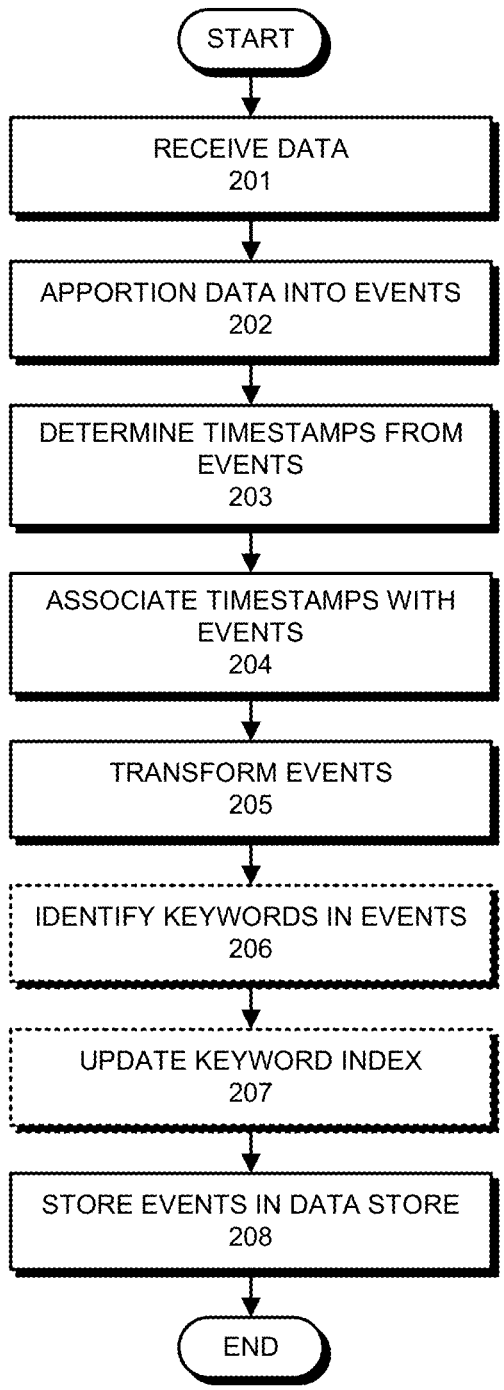
FIG. 10 presents a flowchart illustrating how indexers process, index, and store data received from forwarders in accordance with the disclosed embodiments.

FIG. 10 presents a flowchart illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. application patent Ser. No. 14/266,817 also filed on 30 Apr. 2014.

1.4 Query Processing

Figure 11:
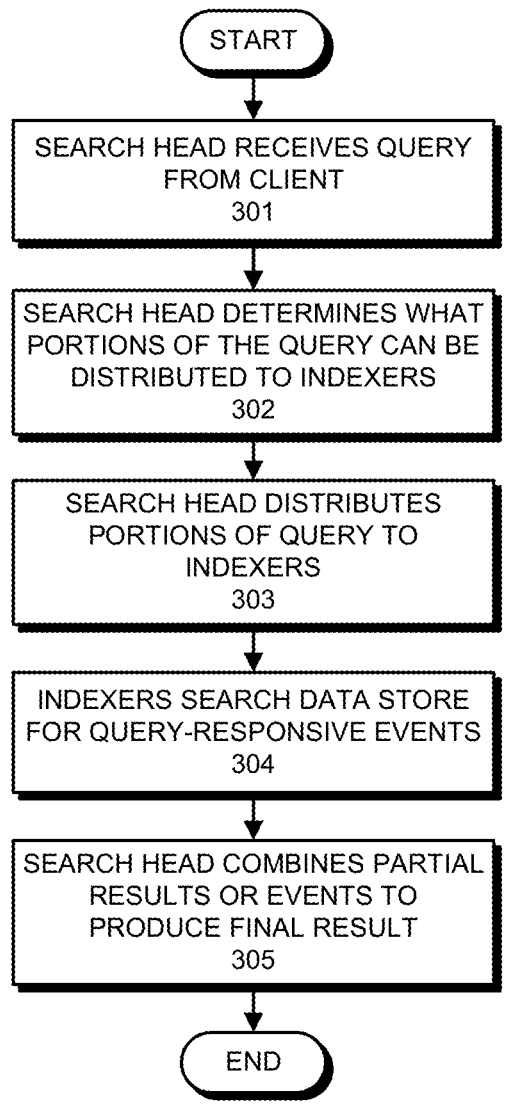
FIG. 11 presents a flowchart illustrating how a search head and indexers perform a search query in accordance with the disclosed embodiments.

FIG. 11 presents a flowchart illustrating how a search head and indexers perform a search query in accordance with the disclosed embodiments. At the start of this process, a search head receives a search query from a client at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding scheme to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 12:
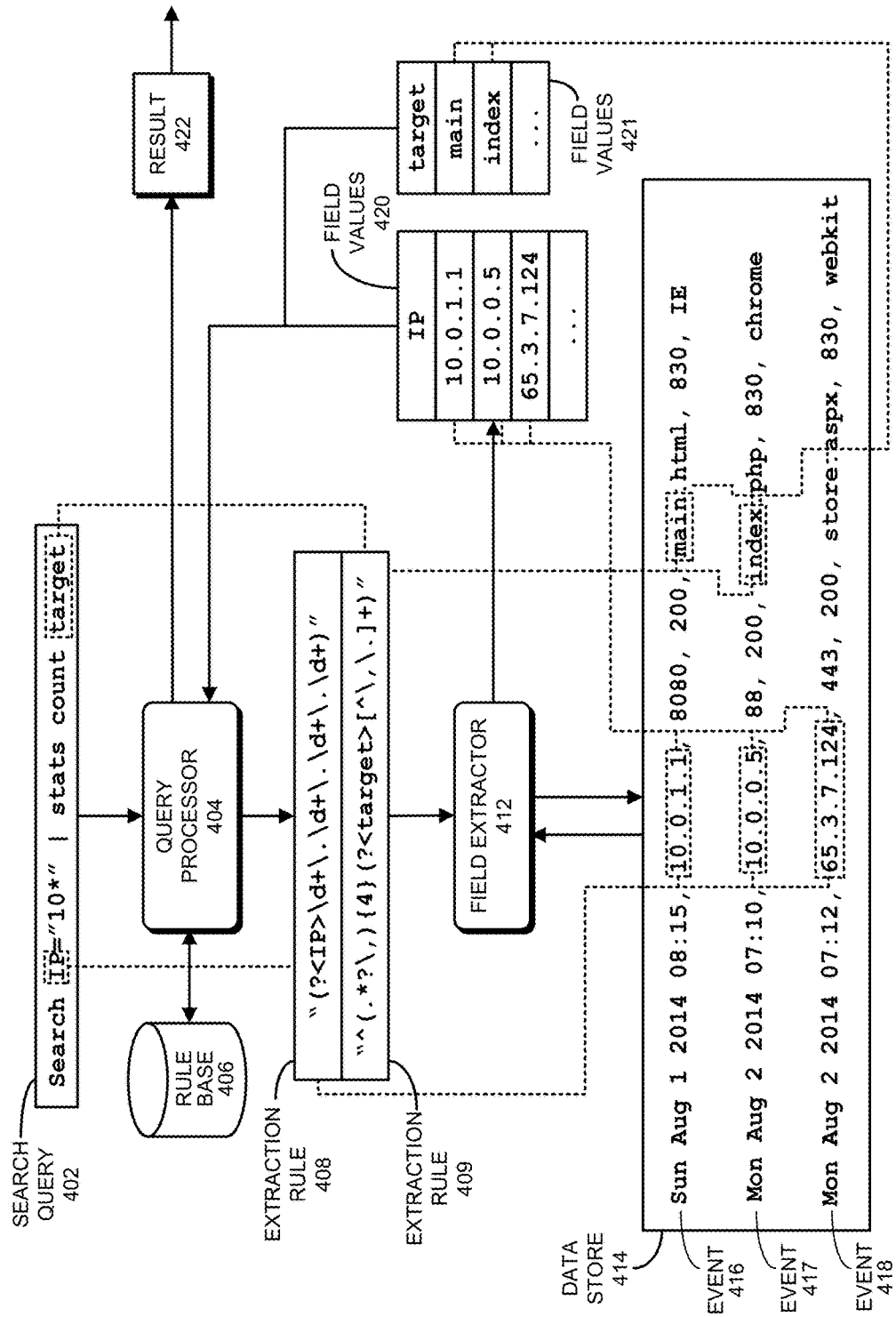
FIG. 12 presents a block diagram of a system for processing search requests that uses extraction rules for field values in accordance with the disclosed embodiments.

FIG. 12 presents a block diagram illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the exemplary search query 402 illustrated in FIG. 4 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, wherein rule base 406 maps field names to corresponding extraction rules and obtains extraction rules 408-409, wherein extraction rule 408 specifies how to extract a value for the "IP" field from an event, and extraction rule 409 specifies how to extract a value for the "target" field from an event. As is illustrated in FIG. 12, extraction rules 408-409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 12. Moreover, the query processor 404 can instruct field extractor 412 to apply the extraction rules to all the events in a data store 414, or to a subset of the events that have been filtered based on some criteria.

Next, field extractor 412 applies extraction rule 408 for the first command "Search IP="10*"" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Exemplary Search Screen

Figure 14A:
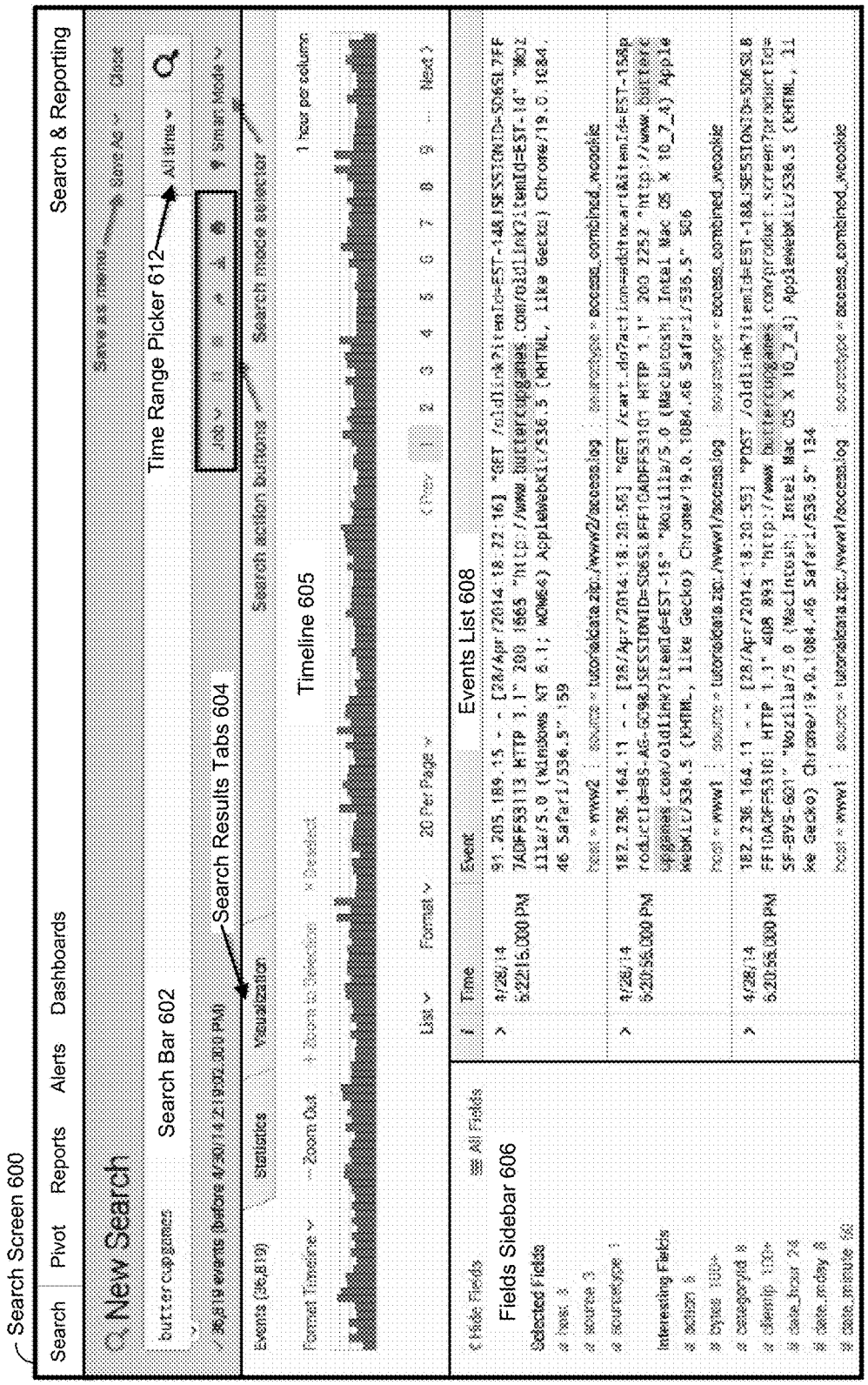
FIG. 14A illustrates a search screen in accordance with the disclosed embodiments.
Figure 14B:
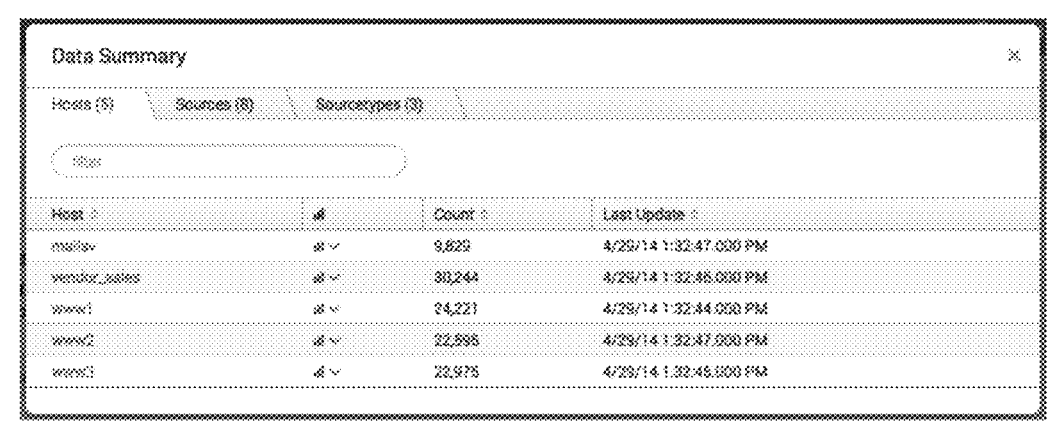

FIG. 14A illustrates an exemplary search screen 600 in accordance with the disclosed embodiments. Search screen 600 includes a search bar 602 that accepts user input in the form of a search string. It also includes a time range picker 612 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 14B that enables the user to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 14A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 13 illustrates how a search query 501 received from a client at search head 104 can split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 11, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

1.7.2 Keyword Index

As described above with reference to the flow charts in FIGS. 10 and 11, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

1.8 Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 15A:
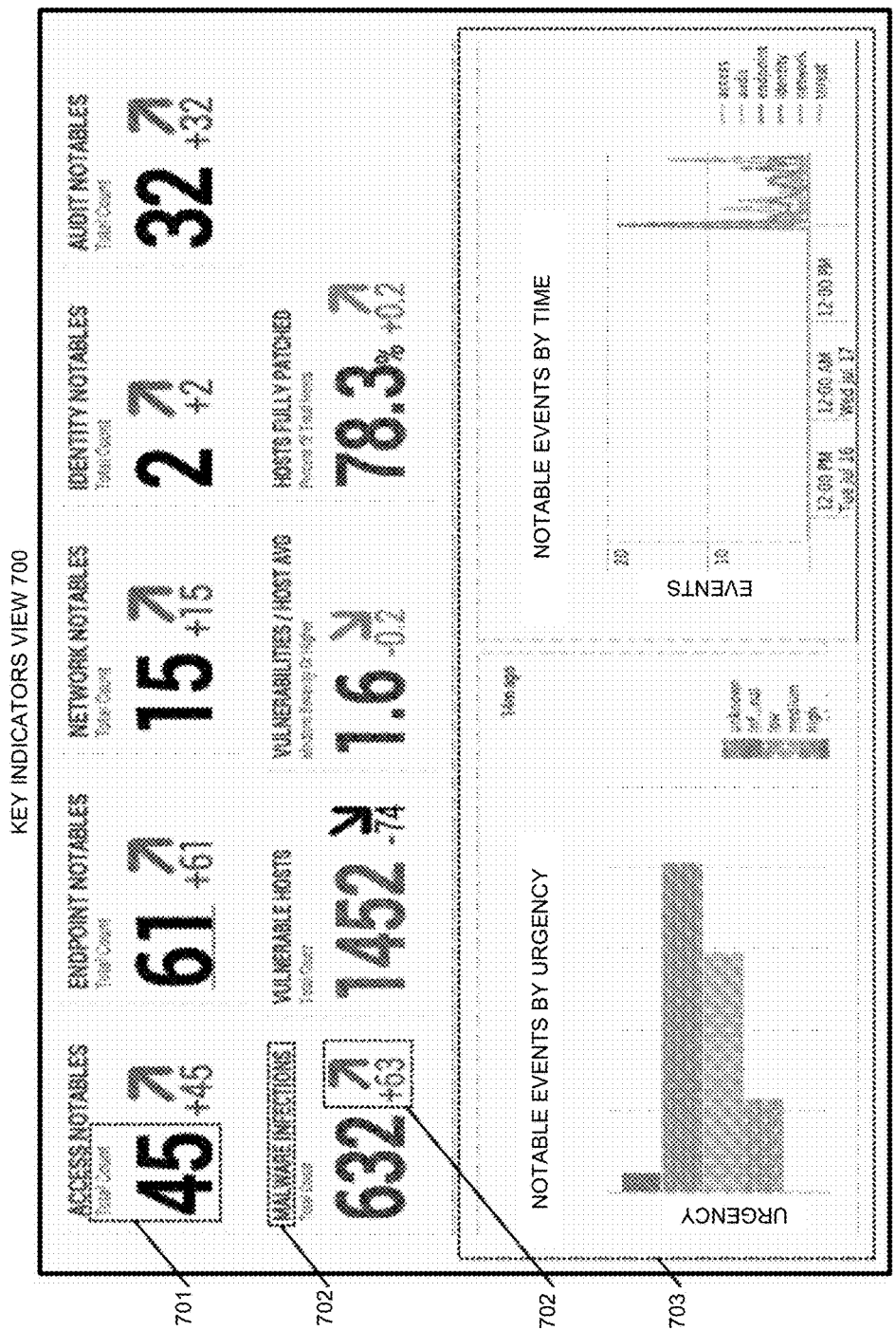
FIG. 15A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 15A illustrates an exemplary key indicators view 700 that comprises a dashboard, which can display a value 701, for various security-related metrics, such as malware infections 702. It can also display a change in a metric value 703, which indicates that the number of malware infections increased by 63 during the preceding interval. Key indicators view 700 additionally displays a histogram panel 704 that displays a histogram of notable events organized by urgency values, and a histogram of notable events organized by time intervals. This key indicators view is described in further detail in pending U.S. patent application Ser. No. 13/956,338 filed Jul. 31, 2013.

Figure 15B:
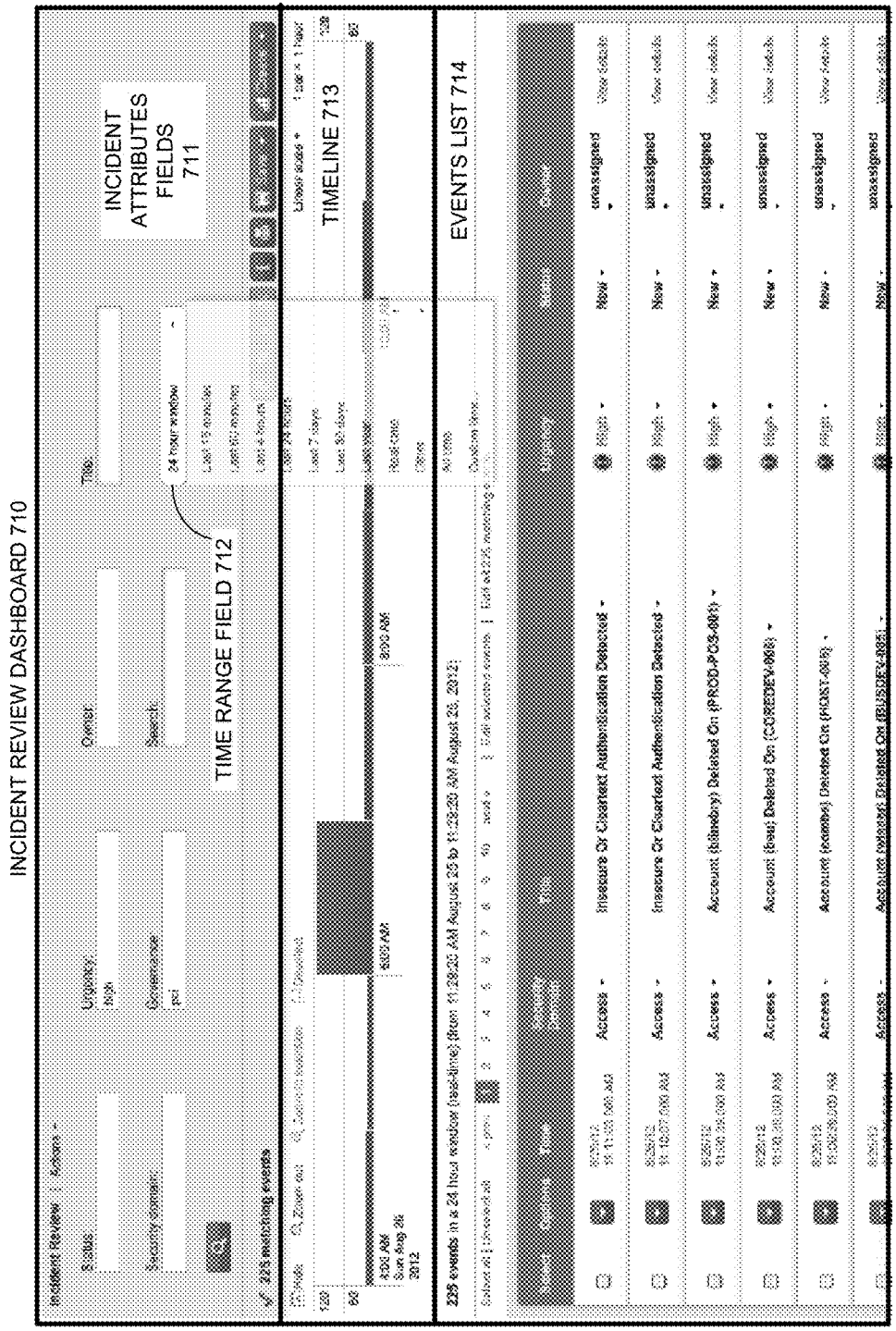
FIG. 15B illustrates an incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 15B illustrates an exemplary incident review dashboard 710 that includes a set of incident attribute fields 711 that, for example, enables a user to specify a time range field 712 for the displayed events. It also includes a timeline 713 that graphically illustrates the number of incidents that occurred in one-hour time intervals over the selected time range. It additionally displays an events list 714 that enables a user to view a list of all of the notable events that match the criteria in the incident attributes fields 711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 15C:
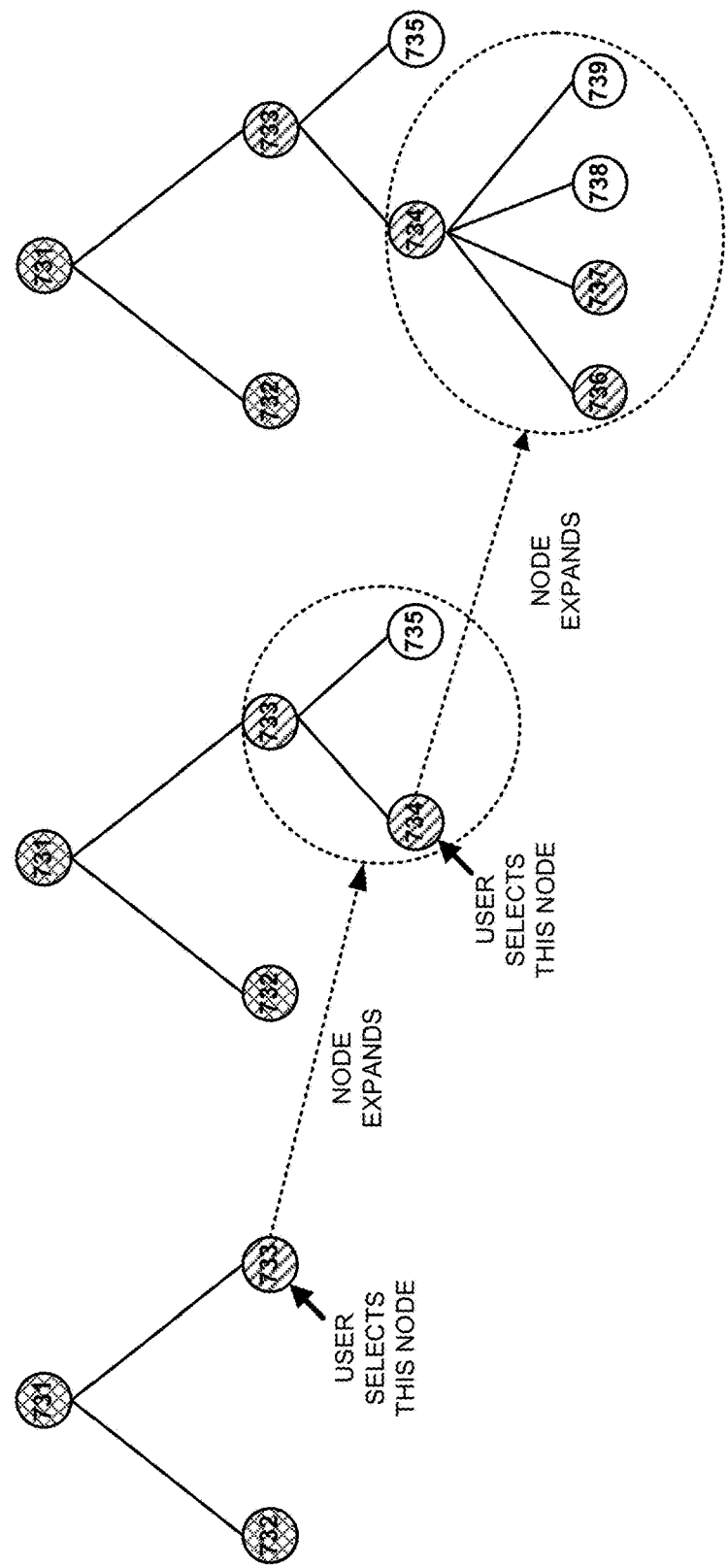
FIG. 15C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 15C, wherein nodes 733 and 734 are selectively expanded. Note that nodes 731-739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 15D:
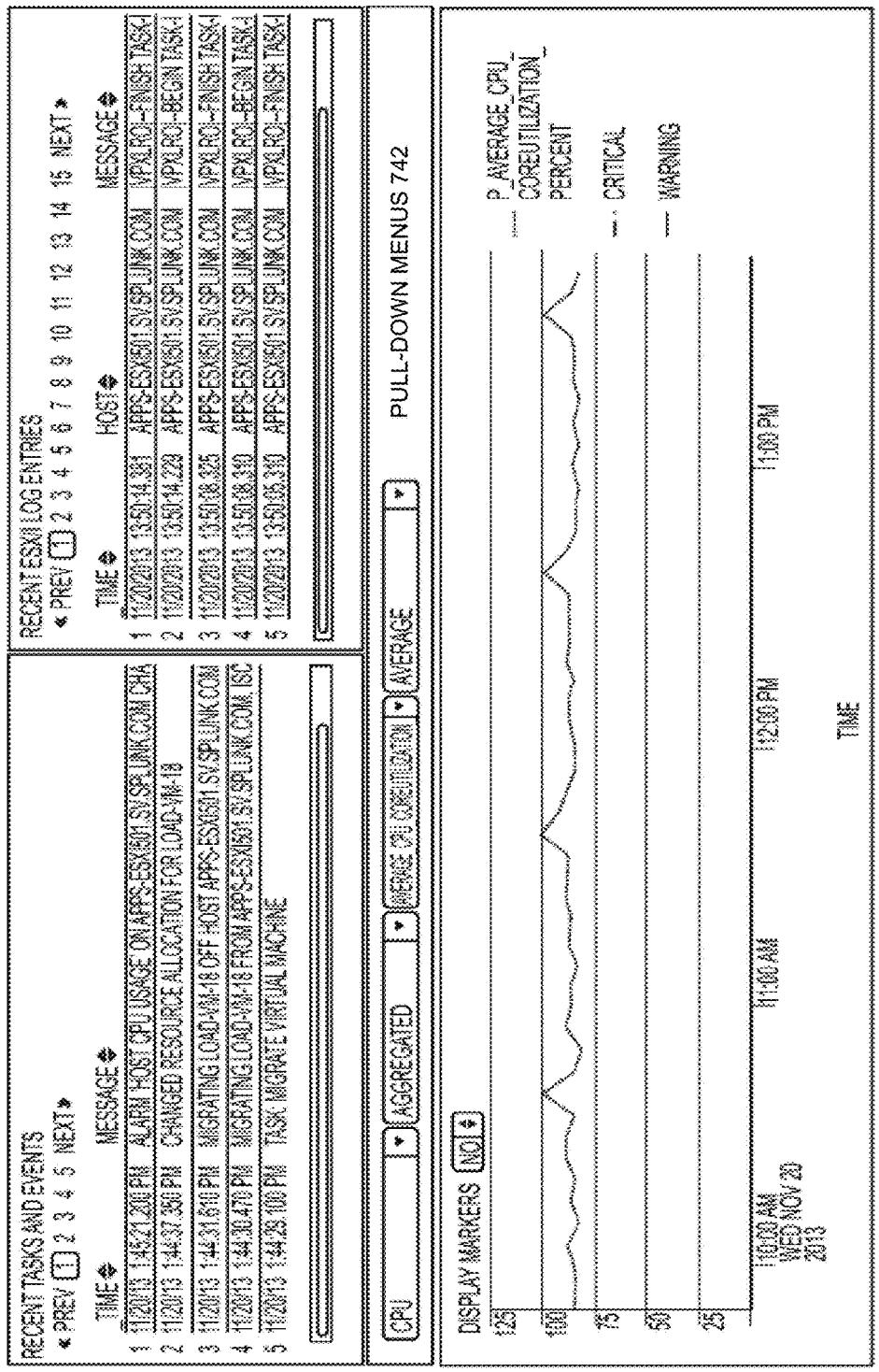
FIG. 15D illustrates a screen displaying both log data and performance data in accordance with the disclosed embodiments.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 15D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

Figure 16:
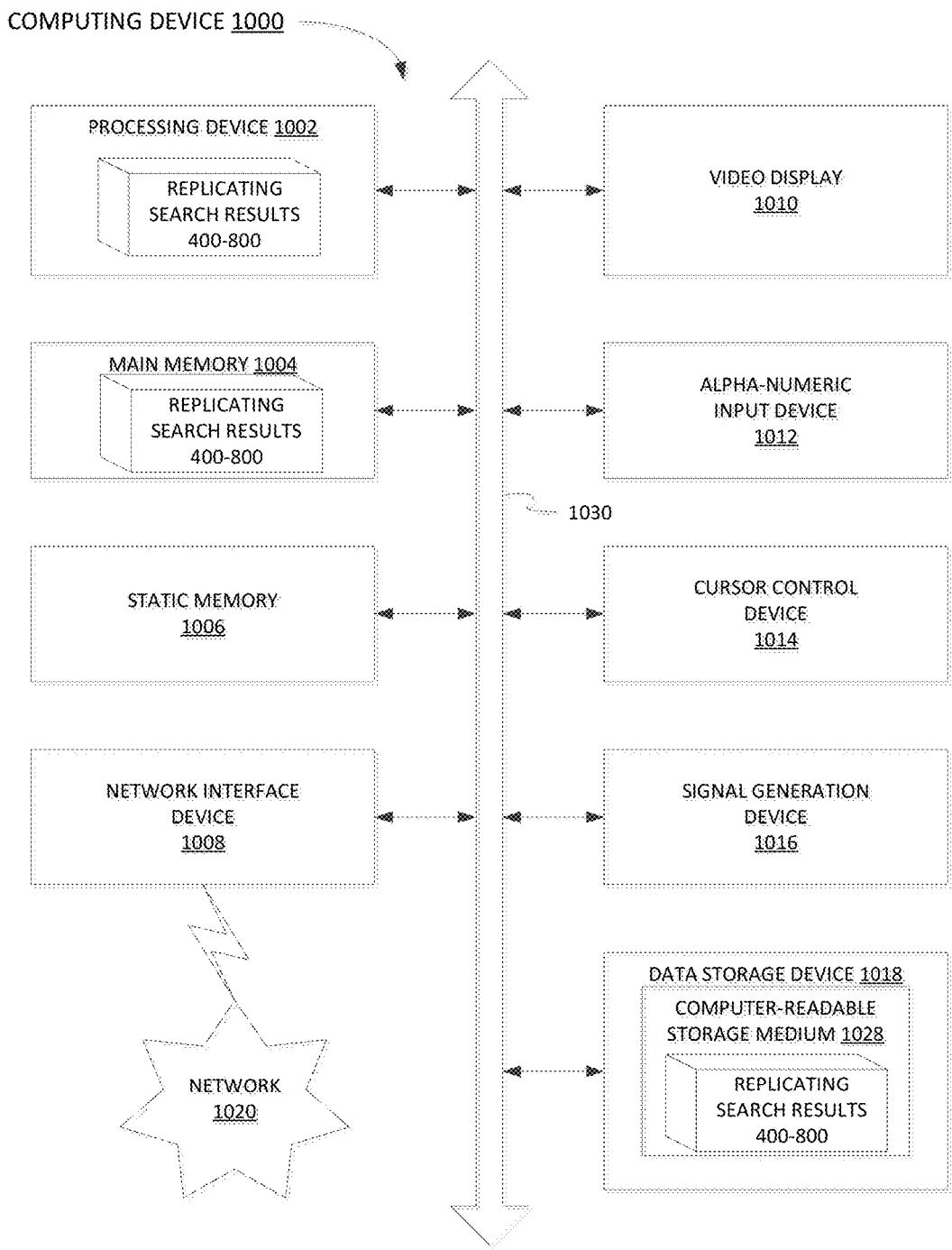
FIG. 16 depicts a block diagram of an example computing device operating in accordance with one or more aspects of the present disclosure.

FIG. 16 illustrates a diagrammatic representation of a computing device 1000 within which a set of instructions for causing the computing device to perform the methods discussed herein may be executed. The computing device 1000 may be connected to other computing devices in a LAN, an intranet, an extranet, and/or the Internet. The computing device 1000 may operate in the capacity of a server machine in client-server network environment. The computing device 1000 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein. In illustrative examples, the computing device 1000 may implement the above described methods 400-800 for replicating search results in a search head cluster.

The example computing device 1000 may include a processing device (e.g., a general purpose processor) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

The processing device 1002 may be provided by one or more general-purpose processing devices such as a microprocessor, central processing unit, or the like. In an illustrative example, the processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also comprise one or more special-purpose processing devices such as an application specific integrated circuit (ASIC), a field programmable gate array (FPGA), a digital signal processor (DSP), a network processor, or the like. The processing device 1002 may be configured to execute the methods 400-800 for replicating search results in a search head cluster, in accordance with one or more aspects of the present disclosure.

The computing device 1000 may further include a network interface device 1008, which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

The data storage device 1018 may include a computer-readable storage medium 1028 on which may be stored one or more sets of instructions (e.g., instructions of the methods 400-800 for replicating search results in a search head cluster, in accordance with one or more aspects of the present disclosure) implementing any one or more of the methods or functions described herein. Instructions implementing methods 400-800 may also reside, completely or at least partially, within main memory 1004 and/or within processing device 1002 during execution thereof by computing device 1000, main memory 1004 and processing device 1002 also constituting computer-readable media. The instructions may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating," "identifying," "determining," "sending," "assigning," or the like refer to actions and processes performed or implemented by computing devices that manipulate and transform data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method operations. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
    causing execution of a search query by a plurality of indexers on source data comprising a plurality of events, wherein the search query is a map-reduce search executed in a search head cluster to generate a search result, wherein the search head cluster comprises a plurality of search heads that are each configured to execute a reduce phase of the map-reduce search, and wherein the reduce phase comprises combining results of a map phase of the map-reduce search to generate the search result, the map phase executed by the plurality of indexers;
    storing, responsive to generating the search result, replicas of the search result in the search head cluster;
    maintaining a replication count in a data store associated with at least one of the plurality of search heads, the replication count corresponding to how many of the replicas of the search result are stored in the search head cluster;
    determining whether the replication count is less than a target replication count;
    based on determining that the replication count is less than the target replication count, selecting a target search head from the plurality of search heads in the search head cluster to receive a replica of the search result;
    initiating a replication of the search result from a source search head of the plurality of search heads in the search head cluster to the selected target search head, the replica of search result to be stored at the selected target search head for high-availability of the search result within the search head cluster or for improved runtime efficiency of the search head cluster;
    receiving an indication that the replication is complete; and
    based on receiving the indication that the replication is complete, increasing the replication count corresponding to the search result;
    wherein the method is performed by one or more processing devices.

2. The method of claim 1, wherein the replication of the search result further comprises a replication of visualization metadata corresponding to the search result.

3. The method of claim 1, wherein the method is performed by a search head leader that was selected using a Raft consensus election protocol from among the plurality of search heads in the search head cluster.

4. The method of claim 1, wherein the method is performed by a search head leader that was selected using a consensus election protocol from among the plurality of search heads in the search head cluster.

5. The method of claim 1, wherein the search result comprises a result of a scheduled search query that repeats on a periodic basis.

6. The method of claim 1, wherein the search result comprises a result of an ad-hoc search that is performed one time.

7. The method of claim 1, wherein selecting the target search head further comprises randomly selecting one of the plurality of search heads.

8. The method of claim 1, wherein selecting the target search head further comprises selecting a search head of the plurality of search heads that is not located in a geographic site of the source search head.

9. The method of claim 1, wherein selecting the target search head further comprises selecting a search head of the plurality of search heads that stores a smallest number of search results.

10. The method of claim 1, wherein selecting the target search head further comprises selecting a search head of the plurality of search heads having the smallest volume of search results measured by amount of memory used to store the search results.

11. The method of claim 1, wherein configuration data corresponding to the search result indicates that the target search head is to reside in a particular geographic site.

12. The method of claim 1, wherein selecting the target search head further comprises selecting a search head of the plurality of search heads that has received a largest number of access requests for the search result.

13. The method of claim 1, wherein the method is performed by a search head leader of the plurality of search heads, the search head leader maintaining an indication of which search heads in the plurality of search heads store a replica of the search result.

14. The method of claim 1, wherein the method is performed by a search head leader of the plurality of search heads, the search head leader maintaining in volatile memory an indication of which search heads in the plurality of search heads store a replica of the search result.

15. The method of claim 1, wherein the target replication count is included in configuration data that has been replicated to each of the plurality of search heads in the search head cluster.

16. The method of claim 1, further comprising replicating to each of the plurality of search heads in the search head cluster a cluster search results registry that indicates which search heads in the plurality of search heads store a replica of the search result.

17. The method of claim 1, further comprising proxying a request for the search result to at least one of the plurality of search heads that store the search result when a search head of the plurality of search heads that receives the request for the search result does not store the search result or a replica of the search result.

18. The method of claim 1, further comprising replicating the search result to a search head in the search head cluster that sent a proxy request for the search result.

19. The method of claim 1, further comprising:
determining that the replication count is greater than the target replication count; and
based on determining that the replication count is greater than the target replication count, deleting at least one replica of the search result.

20. The method of claim 1, wherein the map-reduce search generated the result using a late-binding schema associated with one or more extraction rules defining one or more fields.

21. The method of claim 1, wherein the result was generated by execution of the map-reduce search against machine data in heterogeneous formats.

22. The method of claim 1, wherein the result was generated by execution of the map-reduce search against the plurality of events, wherein the events are time-stamped events, each time-stamped event including a portion of raw machine data.

23. The method of claim 1, further comprising participating in a Raft consensus election protocol to enable another search head in the search head cluster to assume search head leader responsibilities in case of computer or network breakdown.

24. The method of claim 1, further comprising participating in a consensus election protocol to enable another search head in the search head cluster to assume search head leader responsibilities in case of computer or network breakdown.

25. A computer system, comprising:
a memory; and
one or more processing devices, coupled to the memory, to:
cause execution of a search query by a plurality of indexers on source data comprising a plurality of events, wherein the search query is a map-reduce search executed in a search head cluster to generate a search result, wherein the search head cluster comprises a plurality of search heads that are each configured to execute a reduce phase of the map-reduce search, and wherein the reduce phase comprises combining results of a map phase of the map-reduce search to generate the search result, the map phase executed by the plurality of indexers;
store, responsive to generating the search result, replicas of the search result in the search head cluster;
maintain a replication count in a data store associated with at least one of the plurality of search heads, the replication count corresponding to how many of the replicas of the search result are stored in the search head cluster;
determine whether the replication count is less than a target replication count;
based on determining that the replication count is less than the target replication count, select a target search head from the plurality of search heads in the search head cluster to receive a replica of the search result;
initiate a replication of the search result from a source search head of the plurality of search heads in the search head cluster to the selected target search head, the replica of search result to be stored at the selected target search head for high-availability of the search result within the search head cluster or for improved runtime efficiency of the search head cluster;
receive an indication that the replication is complete; and
based on receiving the indication that the replication is complete, increase the replication count corresponding to the search result.

26. The computer system of claim 25, wherein a search head leader of the plurality of search heads performs the determining, the selecting, the initiating, and the increasing, wherein the search head leader is selected using a Raft consensus protocol among the plurality of search heads.

27. The computer system of claim 25, wherein the one or more processing devices to select the target search head further comprises the one or more processing devices to select a search head of the plurality of search heads that is not located in a geographic site of the source search head.

28. A computer-readable non-transitory storage medium comprising executable instructions that, when executed by a computer system, cause the computer system to perform operations comprising:
causing execution of a search query by a plurality of indexers on source data comprising a plurality of events, wherein the search query is a map-reduce search executed in a search head cluster to generate a search result, wherein the search head cluster comprises a plurality of search heads that are each configured to execute a reduce phase of the map-reduce search, and wherein the reduce phase comprises combining results of a map phase of the map-reduce search to generate the search result, the map phase executed by the plurality of indexers;
storing, responsive to generating the search result, replicas of the search result in the search head cluster;
maintaining a replication count in a data store associated with at least one of the plurality of search heads, the replication count corresponding to how many of the replicas of the search result are stored in the search head cluster;
determining whether the replication count is less than a target replication count;

based on determining that the replication count is less than the target replication count, selecting a target search head from the plurality of search heads in the search head cluster to receive a replica of the search result;

initiating a replication of the search result from a source search head of the plurality of search heads in the search head cluster to the selected target search head, the replica of search result to be stored at the selected target search head for high-availability of the search result within the search head cluster or for improved runtime efficiency of the search head cluster;

receiving an indication that the replication is complete; and based on receiving the indication that the replication is complete, increasing the replication count corresponding to the search result;

wherein the operations are performed by one or more processing devices.

29. The computer-readable non-transitory storage medium of claim 28, wherein a search head leader of the plurality of search heads performs the determining, the selecting, the initiating, and the increasing, wherein the search head leader is selected using a Raft consensus protocol among the plurality of search heads.

30. The computer-readable non-transitory storage medium of claim 28, wherein the one or more processing devices to select the target search head further comprises the one or more processing devices to select a search head of the plurality of search heads that is not located in a geographic site of the source search head.

31. A method comprising:

storing replicas of a search result of a particular map-reduce search in a search head cluster comprising a plurality of search heads that are each configured to manage a reduce phase of the particular map-reduce search, wherein the reduce phase comprises combining results of a map phase of the particular map-reduce search to generate the search result, the particular map-reduce search performed in response to execution of a search query on source data;

maintaining a replication count corresponding to how many of the replicas of the search result are stored in the search head cluster;

determining whether the replication count is less than a target replication count;

based on determining that the replication count is less than the target replication count, selecting a target search head from the plurality of search heads in the search head cluster to receive a replica of the search result;

initiating a replication of the search result from a source search head of the plurality of search heads in the search head cluster to the selected target search head, the replica of search result to be stored at the selected target search head for high-availability of the search result within the search head cluster or for improved runtime efficiency of the search head cluster;

receiving an indication that the replication is complete; and based on receiving the indication that the replication is complete, increasing the replication count corresponding to the search result;

wherein the method is performed by one or more processing devices;

wherein the result was generated by execution of the particular map-reduce search against a plurality of time-stamped events, each time-stamped event including a portion of raw machine data.

* * * * *